(12) United States Patent
Chimbe et al.

(10) Patent No.: US 12,025,087 B2
(45) Date of Patent: Jul. 2, 2024

(54) CONTROL DEVICE OF VEHICLE

(71) Applicants: TOYOTA JIDOSHA KABUSHIKI KAISHA, Toyota (JP); MITSUBA CORPORATION, Kiryu (JP)

(72) Inventors: Tomohiro Chimbe, Kariya (JP); Shinji Shibuya, Kiryu (JP); Masahiro Fueki, Kiryu (JP); Masaki Ishizeki, Kiryu (JP); Miya Yamada, Kiryu (JP); Kenji Kamio, Kiryu (JP)

(73) Assignees: TOYOTA JIDOSHA KABUSHIKI KAISHA, Toyota (JP); MITSUBA CORPORATION, Kiryu (JP)

(*) Notice: Subject to any disclaimer, the term of this patent is extended or adjusted under 35 U.S.C. 154(b) by 0 days.

(21) Appl. No.: 18/172,745

(22) Filed: Feb. 22, 2023

(65) Prior Publication Data

US 2023/0272767 A1 Aug. 31, 2023

(30) Foreign Application Priority Data

Feb. 25, 2022 (JP) .................................. 2022-028569

(51) Int. Cl.
*F02N 11/08* (2006.01)
*F16D 48/06* (2006.01)

(52) U.S. Cl.
CPC ........ *F02N 11/0851* (2013.01); *F16D 48/066* (2013.01); *F16D 2500/1026* (2013.01); *F16D 2500/10412* (2013.01); *F16D 2500/3028* (2013.01); *F16D 2500/306* (2013.01); *F16D 2500/3122* (2013.01)

(58) Field of Classification Search
CPC .. F02N 11/0851; F02N 11/08; F02N 11/0862; F02N 15/022; F16D 48/066; F16D 2500/1026; F16D 2500/10412; F16D 2500/3028; F16D 2500/306; F16D 2500/3122; Y02T 10/62; F04B 17/03
See application file for complete search history.

(56) References Cited

U.S. PATENT DOCUMENTS

2012/0290158 A1   11/2012  Yoshikawa
2015/0007695 A1*  1/2015  Hosaka .................. F02N 11/087
                                                        74/7 R

FOREIGN PATENT DOCUMENTS

JP        2004360465 A  * 12/2004  .......... F02N 11/0818
JP        2007-186154 A     7/2007
JP          5018971 B2     9/2012
(Continued)

*Primary Examiner* — Hung Q Nguyen
(74) *Attorney, Agent, or Firm* — Oliff PLC

(57) ABSTRACT

A control device of a vehicle, the vehicle includes an engine, a hydraulic clutch disposed on a power transmission path between the engine and driving wheels, a starter motor for use in startup of the engine, an electric oil pump device discharging hydraulic oil generating oil pressure supplied to the clutch, and a power supply device supplying electric power driving each of the starter motor and the electric oil pump device. The control device includes a startup control unit that performs starter startup control of starting discharge of the hydraulic oil by the electric oil pump device after determining that output voltage of the power supply device or input voltage of the electric oil pump device is higher than or equal to a fixed voltage after completion of cranking by the starter motor upon startup of the engine using the starter motor.

10 Claims, 8 Drawing Sheets

(56) References Cited

FOREIGN PATENT DOCUMENTS

| | | | |
|---|---|---|---|
| JP | 2019-085054 A | 6/2019 | |
| JP | 2019-209790 A | 12/2019 | |
| WO | WO-2006129866 A1 * | 12/2006 | ............... B60K 6/52 |

* cited by examiner

CONTROL DEVICE OF VEHICLE

This application claims priority from Japanese Patent Application No. 2022-028569 filed on Feb. 25, 2022, the disclosure of which is herein incorporated by reference in its entirety.

BACKGROUND OF THE INVENTION

Field of the Invention

The present invention relates to a control device of a vehicle including a starter motor for engine startup.

Description of the Related Art

A control device of a vehicle has been well known that includes an engine, a hydraulic clutch disposed on a power transmission path between the engine and driving wheels, and an electric oil pump device discharging hydraulic oil generating oil pressure supplied to the clutch. A power transmission device described in JP5018971 is an example thereof. JP5918971 discloses that the engine is started up by controlling an electric motor coupled to the power transmission path between the clutch and the driving wheels in a power transmittable manner to output a cranking torque with the clutch being engaged by oil pressure originating from hydraulic oil that the electric oil pump device discharges.

By the way, the engine may be started up by a starter motor disposed on the vehicle to be used for startup of the engine. In such a case, the output voltage of a power supply device supplying electric power for driving the starter motor may temporarily drop. If this power supply device supplies also electric power for driving the electric oil pump device, the electric oil pump device may not possibly work normally when engaging the clutch by driving the electric oil pump device upon startup of the engine. To deal with this, it is conceived to use an electric oil pump device that can work normally even though the input voltage of the electric oil pump device drops accompanying the startup of the engine. In this case, there is a need to use high-performance devices capable of working at low voltage within the interior of the electric oil pump device, such as e.g. disposing a boost power supply circuit inside the electric oil pump device or imparting a function capable of working at low voltage to an inverter included in the electric oil pump device. As a result, a problem may occur that it becomes hard to reduce the size of the electric oil pump device due to e.g. addition of hardware elements.

SUMMARY OF THE INVENTION

The present invention was conceived in view of the above circumstances and an object thereof is to provide a control device of a vehicle capable of reducing the side of the electric oil pump device while dealing with the startup of the engine using the starter motor.

According to a first aspect of the invention, there is provided a control device of a vehicle, the vehicle including (a) an engine, a hydraulic clutch disposed on a power transmission path between the engine and driving wheels, a starter motor for use in startup of the engine, an electric oil pump device discharging hydraulic oil generating oil pressure supplied to the clutch, and a power supply device supplying electric power driving each of the starter motor and the electric oil pump device, the control device comprising (b) a startup control unit that performs starter startup control of starting discharge of the hydraulic oil by the electric oil pump device after determining that output voltage of the power supply device or input voltage of the electric oil pump device is higher than or equal to a fixed voltage after completion of cranking by the starter motor upon startup of the engine using the starter motor.

According to a second aspect of the invention, in the control device of the first aspect of the invention, when the startup control unit performs the starter startup control, the startup control unit supplies the oil pressure originating from the hydraulic oil to the clutch to switch the clutch from a released state to an engaged state after starting discharge of the hydraulic oil by the electric oil pump device.

According to a third aspect of the invention, in the control device according to the first or second aspect of the invention, the startup control unit starts startup of the engine with the starter motor and the electric oil pump device each being supplied with the electric power, and, if the startup control unit determines that the input voltage of the electric oil pump device is higher than or equal to the fixed voltage after completion of the cranking, starts discharge of the hydraulic oil by the electric oil pump device.

According to a fourth aspect of the invention, in the control device according to the third aspect of the invention, the startup control unit determines whether the input voltage of the electric oil pump device is higher than or equal to the fixed voltage after completion of the cranking in a state where a fixed preparation time needed for the electric oil pump device to become ready to work has elapsed from a point in time of start of supply of the electric power to the electric oil pump device has started.

According to a fifth aspect of the invention, in the control device according to the third or fourth aspect of the invention, the startup control unit determines whether the input voltage of the electric oil pump device is higher than or equal to the fixed voltage, by determining whether the electric oil pump device has detected that the input voltage of the electric oil pump device is higher than or equal to the fixed voltage.

According to a sixth aspect of the invention, in the control device according to the first or second aspect of the invention,
the startup control unit starts startup of the engine with the starter motor being supplied with the electric power, and, if the startup control unit determines that the output voltage of the power supply device is higher than or equal to the fixed voltage after completion of the cranking, starts supply of the electric power to the electric oil pump device to start discharge of the hydraulic oil by the electric oil pump device.

According to a seventh aspect of the invention, in the control device according to any one of the first through sixth aspects of the invention,
if the startup control unit determines that the electric oil pump device is in a state where its normal operation is possible after completion of the cranking, the startup control unit starts discharge of the hydraulic oil by the electric oil pump device.

According to a eighth aspect of the invention, in the control device according to any one of the first through seventh aspects of the invention,
the startup control unit performs clutch startup control of:
controlling the clutch to transmit a cranking torque required for cranking that increases rotation number of the engine;
controlling an electric motor driven by electric power supplied from a high-voltage power supply device disposed to charge the power supply device, the electric motor being coupled to a power transmission path between the clutch and the driving wheels in a power transmittable manner to output the cranking torque in liaison with cranking by the clutch; and controlling the engine to start its operation in liaison with the cranking by the clutch, and wherein in case that the clutch startup control is difficult to perform, the startup control unit performs the starter startup control.

According to a ninth aspect of the invention, in the control device according to the eighth aspect of the invention, the case that the clutch startup control is difficult to perform is a case that the engine is started for the first time after activation of the vehicle.

According to a tenth aspect of the invention, in the control device according to the eighth or ninth aspect of the invention, the case that the clutch startup control is difficult to perform is a case that the vehicle lies in a predefined ultralow temperature environment where the electric motor is determined as not being properly controlled.

Advantageous Effect of the Invention

According to the first aspect of the invention, the starter startup control to start discharge of hydraulic oil by the electric oil pump device is performed after the output voltage of the power supply device or the electric oil pump device input voltage has been determined to be higher than or equal to the fixed voltage after the completion of cranking by the starter motor. As a result, in case that the output voltage of the power supply device drops accompanying the cranking, the electric oil pump device can be normally activated without arranging the high-performance devices capable of working upon the voltage drop inside the electric oil pump device. It is thus possible to achieve the size reduction of the electric oil pump device while dealing with the startup of the engine using the starter motor.

According to the second aspect of the invention, when the starter startup control is performed, the oil pressure originating from hydraulic oil is supplied to the clutch after starting discharge of hydraulic oil by the electric oil pump device, to switch the clutch from the released state to the engaged state, consequently making it possible to become ready for start of the vehicle while achieving the size reduction of the electric oil pump device.

According to the third aspect of the invention, startup of the engine is started with the starter motor and the electric oil pump device each being supplied with electric power, and discharge of the hydraulic oil is started by the electric oil pump device in case that it is determined that the electric oil pump device input voltage is higher than or equal to the fixed voltage after the completion of cranking, whereupon the electric oil pump device is already supplied with electric power at the point in time of the completion of cranking so that discharge of hydraulic oil is started the instant that the input voltage becomes higher than or equal to the fixed voltage. As a result, in case that oil pressure originating from hydraulic oil is supplied to the clutch to switch the clutch from the released state to the engaged state, rapid engagement of the clutch is achieved leading to improved responsiveness for vehicle start.

According to the fourth aspect of the invention, it is determined whether the electric oil pump device input voltage is higher than or equal to the fixed voltage after the completion of cranking, in the state where the fixed preparation time needed to be ready for activation of the electric oil pump device has elapsed from the point in time of starting power supply to the electric oil pump device, whereupon discharge of hydraulic oil is started, without waiting the lapse of the fixed preparation time, instantly the input voltage becomes higher than or equal to the fixed voltage.

According to the fifth aspect of the invention, it is determined whether the electric oil pump device input voltage is higher than or equal to the fixed voltage, based on the determination of whether the electric oil pump device has detected that the electric oil pump device input voltage is higher than or equal to the fixed voltage, thus eliminating the need to dispose the high-performance devices capable of working upon the voltage drop inside the electric oil pump device.

According to the sixth aspect of the invention, startup of the engine is started with the starter motor being supplied with electric power, and, if the output voltage of the power supply device is determined to be higher than or equal to the fixed voltage after the completion of cranking, supply of electric power to the electric oil pump device is started so that discharge of hydraulic oil is started by the electric oil pump device, thus making it possible to avoid the state where the electric oil pump device cannot work normally when the output voltage of the power supply device drops accompanying the cranking. Thus, in case that the oil pressure originating from hydraulic oil is supplied to the clutch to switch the clutch from the released state to the engaged state, the clutch can be engaged while avoiding the state where the electric oil pump device cannot work normally.

According to the seventh aspect of the invention, in case that the electric oil pump device has been determined to be in the state where its normal operation is possible after the completion of cranking, discharge of hydraulic oil is started by the electric oil pump device, so that normal operation of the electric oil pump device can be ensured.

According to the eighth aspect of the invention, the starter startup control is performed in case that the clutch startup control is difficult to perform, thereby rendering it possible to achieve the size reduction of the electric oil pump device while dealing with the startup of the engine using the starter motor, different from the startup of the engine usually done.

According to the ninth aspect of the invention, the case where the clutch startup control is difficult to perform means the case where the engine is started up for the first time after activation of the vehicle, whereupon proper startup of the engine can be ensured prior to the completion of warming up.

According to the tenth aspect of the invention, the case where the clutch startup control is difficult to perform means the case where the vehicle lies in the predefined ultralow temperature environment in which proper control of the electric motor is determined to be difficult to perform, so that the engine can be properly started up under the ultralow temperature environment.

DESCRIPTION OF THE PREFERRED EMBODIMENTS

Embodiments of the present invention will now be described in detail with reference to the drawings.

First Embodiment

Figure 1:
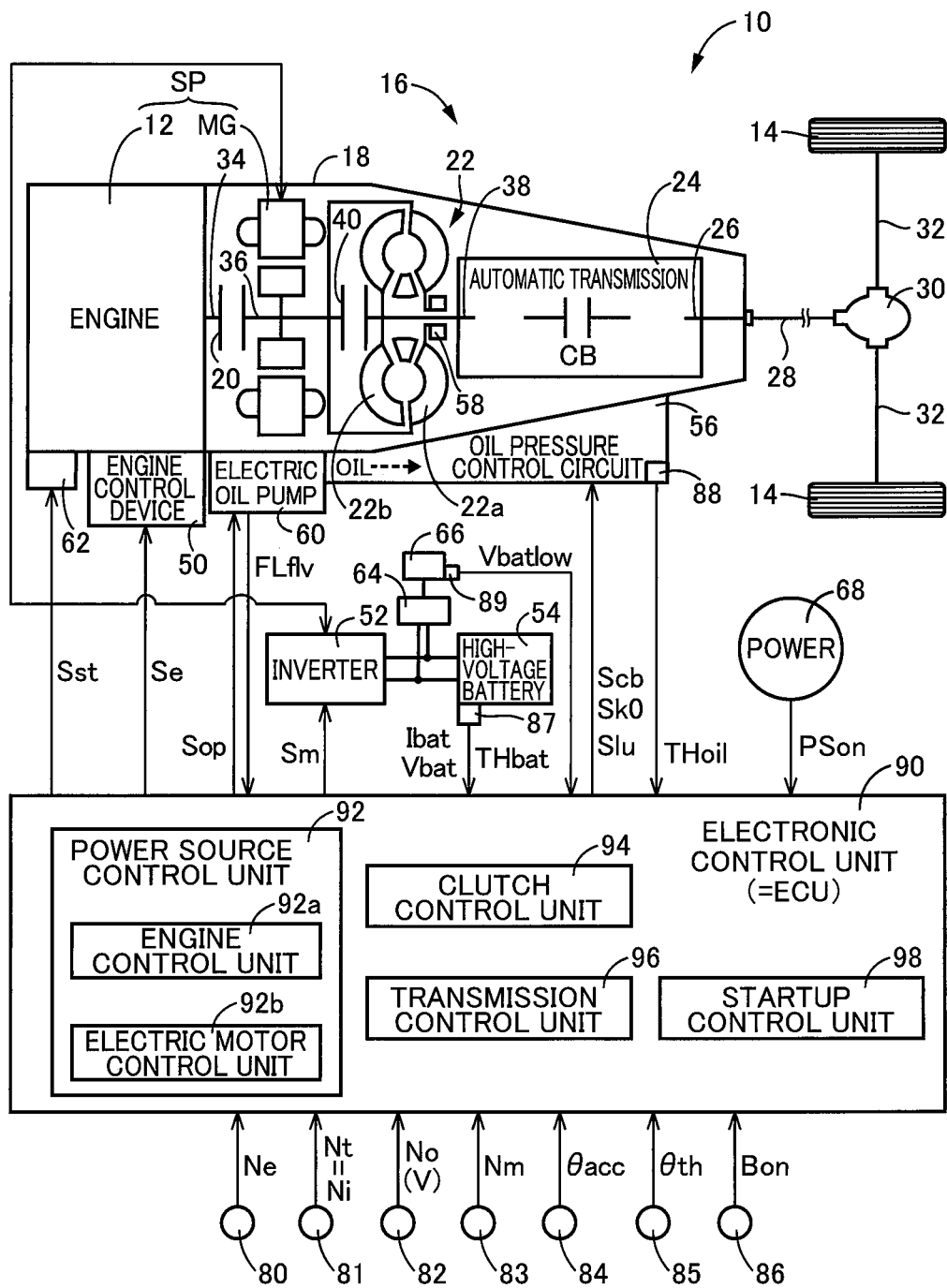
FIG. 1 is a view explaining a schematic configuration of a vehicle to which the present invention is applied, the view explaining principal part of a control system and control functions for various controls in the vehicle.

FIG. 1 is a view explaining a schematic configuration of a vehicle 10 to which the present invention is applied, the view explaining principal part of a control system and control functions for various controls in the vehicle 10. In FIG. 1, the vehicle 10 is a hybrid vehicle including an engine 12 and an electric motor MG that function as a power source SP. The vehicle 10 includes driving wheels 14 and a power transmission device 16 disposed on a power transmission path between the engine 12 and the driving wheels 14.

The engine 12 is a publicly known internal combustion engine such as a gasoline engine or a diesel engine. In the engine 12, the torque of the engine 12, engine torque $T_e$, is controlled by controlling an engine control device 50 including a throttle actuator, a fuel injector, an ignitor, etc. disposed in the vehicle 10, by an electronic control unit (ECU) 90 that will be described later.

The electric motor MG is a so-called motor generator that is a rotary electric machine functioning as both a mover that generates mechanical power from electric power and a generator that generates electric power from mechanical power. The electric motor MG is connected, via an inverter 52 disposed in the vehicle 10, to a high-voltage battery 54 disposed in the vehicle 10. The high-voltage battery 54 is an electric-power accumulator supplying/receiving electric power to/from the electric motor MG. In the electric motor MG, the torque of the electric motor MG, MG torque $T_m$, is controlled by controlling the inverter 52 by the electronic control unit 90 that will be described later. During power running, the electric motor MG is driven by electric power supplied from the high-voltage battery 54. During regeneration, the electric motor MG supplies generated electric power to the high-voltage battery 54. For example, in case that the rotation direction of the electric motor MG is a forward rotation direction that is the same as when the engine 12 is operating, the MG torque $T_m$ is a positive motoring torque on the acceleration side and is a negative regenerative torque on the deceleration side. The electric power means electric energy if not particularly distinguished. The power means driving force, torque, or force if not particularly distinguished.

The power transmission device 16 includes a K0 clutch 20, a torque converter 22, an automatic transmission 24, etc. inside a case 18 that is a non-rotating member fitted to a vehicle body. The K0 clutch 20 is a clutch disposed between the engine 12 and the electric motor MG on the power transmission path between the engine 12 and the driving wheels 14. The torque converter 22 is connected via the K0 clutch 20 to the engine 12. The automatic transmission 24 is coupled to the torque converter 22 and lies on the power transmission path between the torque converter 22 and the driving wheels 14. The automatic transmission 24 is a transmission disposed between the electric motor MG and the driving wheels 14 on the power transmission path between the engine 12 and the driving wheels 14. The power transmission device 16 includes a propeller shaft 28 coupled to a transmission output shaft 26 that is an output rotary member of the automatic transmission 24, a differential gear 30 coupled to the propeller shaft 28, a pair of drive shafts 32 coupled to the differential gear 30, etc. The power transmission device 16 includes an engine coupling shaft 34 coupling the engine 12 and the K0 clutch 20, an electric motor coupling shaft 36 coupling the K0 clutch 20 and the torque converter 22, etc.

Inside the case 18, the electric motor MG is coupled to the electric motor coupling shaft 36 in a power transmittable manner. That is, the electric motor MG is coupled, in a power transmittable manner, to the power transmission path between the engine 12 and the driving wheels 14, particularly, to the power transmission path between the K0 clutch 20 and the torque converter 22. In other words, the electric motor MG is coupled to the torque converter 22 and the automatic transmission 24 in a power transmittable manner without the K0 clutch 20 intervening therebetween.

The torque converter 22 includes a pump blade wheel 22a coupled to the electric motor coupling shaft 36 and a turbine blade wheel 22b coupled to a transmission input shaft 38 that is an input rotary member of the automatic transmission 24. The torque converter 22 is a hydrodynamic power transmitting device that transmits power from the power source SP, via a fluid, from the electric motor coupling shaft 36 to the transmission input shaft 38. The torque converter 22 includes an LU clutch 40 as a direct-coupling clutch that couples the pump blade wheel 22a and the turbine blade wheel 22b, i.e., that couples the electric motor coupling shaft 36 and the transmission input shaft 38. The LU clutch 40 is a publicly known lockup clutch.

The automatic transmission 24 is a publicly known planetary gear type automatic transmission that includes, for example, a set of or plural sets of planetary gears not shown and engagement devices CB. The engagement devices CB include, for example, a plurality of hydraulic engagement devices e.g. publicly known friction engagement devices. In each of the engagement devices CB, its working state i.e. control state, such as engaged state, slip state, or released state, is switched by changing its torque capacity, CB torque $T_{cb}$, by a CB oil pressure $PR_{cb}$, that is a regulated oil pressure supplied from an oil pressure control circuit 56 disposed in the vehicle 10.

The automatic transmission 24 is a stepped transmission in which engagement of any of the engagement devices CB forms any of a plurality of shift stages (also called gear stages) each having a different shift ratio (also called gear ratio) $\gamma_{at}$ (=AT input rotation number $N_i$/AT output rotation number $N_o$). In the automatic transmission 24, the gear stage to be formed is switched by switching the control state of one engagement device involved in shifting of the automatic transmission 24, of the engagement devices CB, in response to a driver's accelerator operation, a vehicle velocity V, etc., by the electronic control unit 90 that will be described later. The AT input rotation number $N_i$ is a rotation number of the transmission input shaft 38 and an input rotation number of the automatic transmission 24. The AT input rotation number $N_i$ is equal to a turbine rotation number $N_t$ that is an output rotation number of the torque converter 22. The AT input rotation number $N_i$ is represented by the turbine rotation number $N_t$. The AT output rotation number $N_o$ is a rotation number of the transmission output shaft 26 and is an output rotation number of the automatic transmission 24.

The K0 clutch 20 is a hydraulic friction engagement device composed of e.g. a multi-plate or single-plate clutch. In the K0 clutch 20, the control state, such as engaged state, slip state, or released state is switched by changing a K0 torque $T_{k0}$ i.e. a torque capacity of the K0 clutch 20, by a K0 oil pressure $PR_{k0}$ that is a regulated oil pressure supplied from the oil pressure control circuit 56.

In the vehicle 10, when the K0 clutch 20 is in the engaged state, the engine 12 and the torque converter 22 are coupled together in a power transmittable manner. On the other hand, when the K0 clutch 20 is in the released state, power transmission is cut off between the engine 12 and the torque converter 22. Since the electric motor MG is coupled to the torque converter 22, the K0 clutch 20 acts as a clutch for connecting/disconnecting the engine 12 to/from the electric motor MG.

In the power transmission device 16, when the K0 clutch 20 is engaged, power output from the engine 12 is transmitted from the engine coupling shaft 34 through the K0 clutch 20, the electric motor coupling shaft 36, the torque converter 22, the automatic transmission 24, the propeller shaft 28, the differential gear 30, the drive shafts 32, etc. in order, to the driving wheels 14.

The vehicle 10 further includes an MOP 58 that is a mechanical oil pump, an electric oil pump 60 that is an electrically-driven oil pump device, a starter motor 62, a DC/DC converter 64, a low-voltage battery 66, a start button 68, etc.

The MOP 58 is coupled to the pump blade wheel 22a and rotationally driven by the power source SP to discharge hydraulic oil OIL for use in the power transmission device 16. The power source SP rotationally driving the MOP 58 is the electric motor MG when the K0 clutch 20 is released, whereas the power source SP is at least the engine 12 when the K0 clutch 20 is engaged. The electric oil pump 60 discharges hydraulic oil OIL by rotationally driving a pump 72 for electric oil pump (see FIGS. 2 and 3 described later) included in the electric oil pump 60, by a motor 70 for electric oil pump (see FIGS. 2 and 3 described later) included in the electric oil pump 60. The electric oil pump 60 is operated e.g. in case that the MOP 58 cannot work or where the flow of hydraulic oil OIL discharged from the MOP 58 is insufficient. Hydraulic oil OIL discharged from the MOP 58 or the electric oil pump 60 is supplied to the oil pressure control circuit 56. The oil pressure control circuit 56 supplies the CB oil pressure $PR_{cb}$, the K0 oil pressure $PR_{k0}$, etc. that have each been regulated based on hydraulic oil OIL discharged from the MOP 58 and/or the electric oil pump 60.

The starter motor 62 is a starting motor used to start the engine 12. The starter motor 62 is a dedicated motor for rotationally driving, i.e., cranking up the engine 12 when starting the engine 12.

The DC/DC converter 64 is connected to the high-voltage battery 54. The low-voltage battery 66 is connected to the DC/DC converter 64 by which it is charged with electric power supplied from the high-voltage battery 54. The high-voltage battery 54 is a high-tension battery storing a voltage higher than that of the low-voltage battery 66 and is a high-voltage power supply device disposed to charge the low-voltage battery 66.

The start button 68 is a power switch operated by the driver to switch the state of supply of the power source in the vehicle 10, i.e., the vehicle power source state. The start button 68 is e.g. a momentary push button switch pushed to a switch-on position by the driver. Each time pushed to the switch-on position, the start button 68 outputs a power switch signal $PS_{on}$ corresponding to the switch-on position to the electronic control unit 90 that will be described later. The electronic control unit 90 detects the driver's operation of the start button 68, based on the power switch signal $PS_{on}$.

The vehicle power source state includes, for example, off (OFF) state as off state, accessary-on (ACC) state as partial-on state, and ignition-on (IG-ON) state as on state. The OFF state is e.g. a power source state for disabling the vehicle running and disabling some functions not involved in the vehicle running. The ACC state is e.g. a power source state for disabling the vehicle running with a combination meter not shown turned off, but for enabling some functions not involved in the vehicle running. The IG-ON state is e.g. a power source state for enabling the vehicle running with the combination meter turned on.

Figure 2:
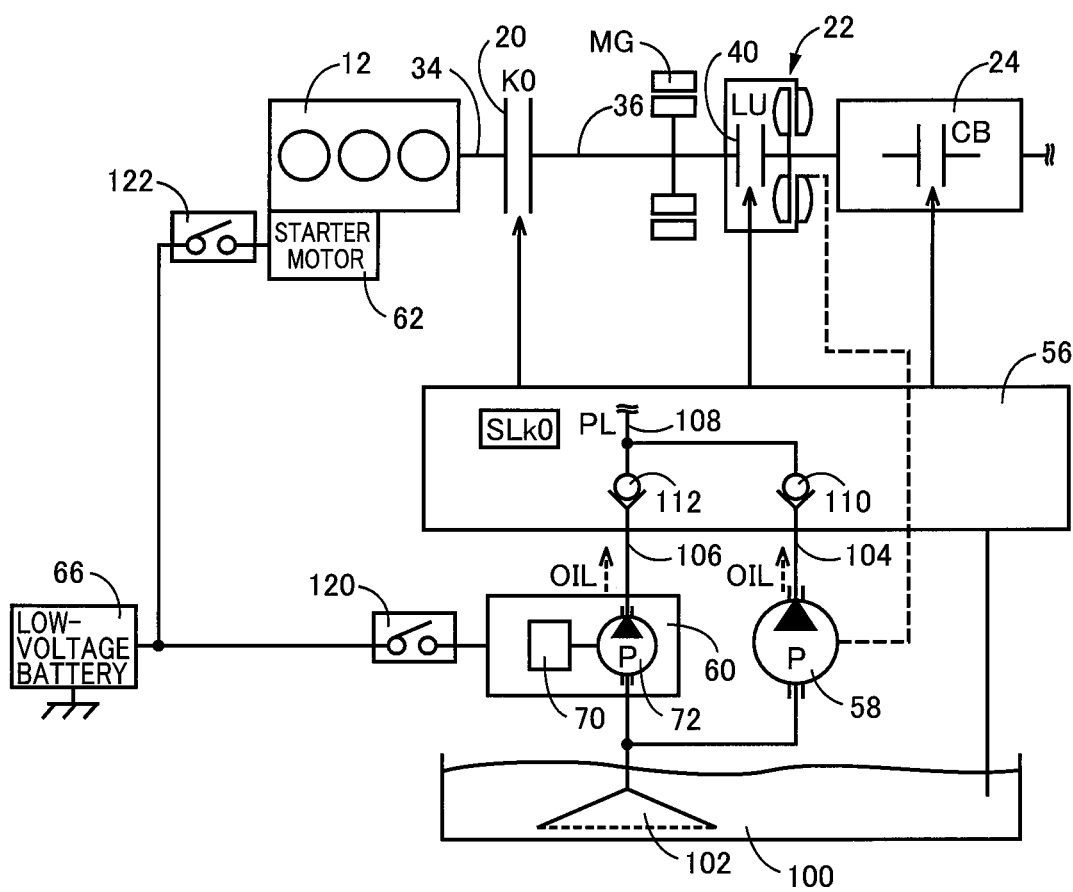
FIG. 2 is a view explaining oil pressure sources supplying hydraulic oil to the oil pressure control circuit, and destinations of electric power supply from the low-voltage battery.

FIG. 2 is a view explaining oil pressure sources supplying hydraulic oil OIL to the oil pressure control circuit 56, and destinations of electric power supply from the low-voltage battery 66. In FIG. 2, the electric oil pump 60 includes the motor 70 for electric oil pump, the pump 72 for electric oil pump, etc. (see FIG. 3). The motor 70 for electric oil pump is a motor dedicated to the electric oil pump 60, for rotationally driving the pump 72 for electric oil pump. The pump 72 for electric oil pump is an electrically-driven oil pump that is rotationally driven by the motor 70 for electric oil pump to discharge hydraulic oil OIL. The MOP 58 and the pump 72 for electric oil pump are disposed in parallel due to the configuration of oil passages through which hydraulic oil OIL flows. The MOP 58 and the pump 72 for electric oil pump each suck hydraulic oil OIL refluxed to an oil pan 100 disposed at the bottom of the case 18, through a strainer 102 that is a common suction port, to discharge it into their respective discharge oil passages 104 and 106. The discharge oil passages 104 and 106 are each coupled to an oil passage included in the oil pressure control circuit 56, for example, a line pressure oil passage 108 that is an oil passage through which a line pressure PL flows. The discharge oil passage 104 receiving hydraulic oil OIL discharged from the MOP 58 is coupled to the line pressure oil passage 108 via a check valve 110 for MOP included in the oil pressure control circuit 56. The discharge oil passage 106 receiving hydraulic oil OIL discharged from the pump 72 for electric oil pump is coupled to the line pressure oil passage 108 via a check valve 112 for electric oil pump included in the oil pressure control circuit 56.

The oil pressure control circuit 56 includes a K0 solenoid $SL_{k0}$ and a regulator valve, a solenoid valve for PL, a plurality of CB solenoids, etc., which are not shown, in addition to the line pressure oil passage 108, the check valve 110 for MOP, and the check valve 112 for electric oil pump.

The regulator valve regulates the line pressure PL, based on hydraulic oil OIL discharged from the MOP 58 and/or the pump 72 for electric oil pump. The solenoid valve for PL, is, for example, a linear solenoid valve that is controlled by the electronic control unit 90 described later so as to output a pilot pressure corresponding to e.g. an input torque Tin into the automatic transmission 24, to the regulator valve, based on a modulator pressure. This allows the line pressure PL to be regulated to a value corresponding to e.g. the input torque Tin into the automatic transmission 24. The modulator pressure is an oil pressure that has been regulated to a certain value by a modulator valve not shown, based on the line pressure PL for example.

The K0 solenoid SLk0 is a solenoid valve for the K0 clutch 20, esp., a linear solenoid valve that is controlled by the electronic control unit 90 described later so as to supply the regulated K0 oil pressure $PR_{k0}$ to the K0 clutch 20, based on the line pressure PL. The CB solenoids are each disposed corresponding to each of the engagement devices CB and is a linear solenoid valve supplying the CB oil pressure based on the line pressure PL similar to the K0 solenoid $SL_{k0}$.

The low-voltage battery 66 is connected to the electric oil pump 60 by way of an electric oil pump relay 120 disposed in the vehicle 10. The low-voltage battery 66 is connected to the starter motor 62 by way of a starter relay 122 disposed in the vehicle 10. The low-voltage battery 66 supplies electric power to the electric oil pump 60 when the electric oil pump relay 120 closes at its contact by becoming on, i.e., by being activated in response to a command from the electronic control unit 90 that will be described later. The low-voltage battery 66 supplies electric power to the starter motor 62 when the starter relay 122 closes at its contact by becoming on in response to a command from the electronic control unit 90 that will be described later. In this manner, the low-voltage battery 66 is a power supply device that supplies electric power for driving each of the electric oil pump 60 and the starter motor 62. An electric oil pump input voltage $V_{op}$ i.e. the input voltage of the electric oil pump 60 is 0 [V] when the electric oil pump relay 120 is off, whereas when the electric oil pump relay 120 is on, the electric oil pump input voltage $V_{op}$ is e.g. 12 [V] that is a low-voltage battery voltage $V_{batlow}$, i.e. the output voltage of the low-voltage battery 66. A starter motor input voltage $V_{st}$ i.e. the input voltage of the starter motor 62 is 0 [V] when the starter relay 122 is off, whereas it is equal to the low-voltage battery voltage $V_{batlow}$ when the starter relay 122 is on.

Figure 3:
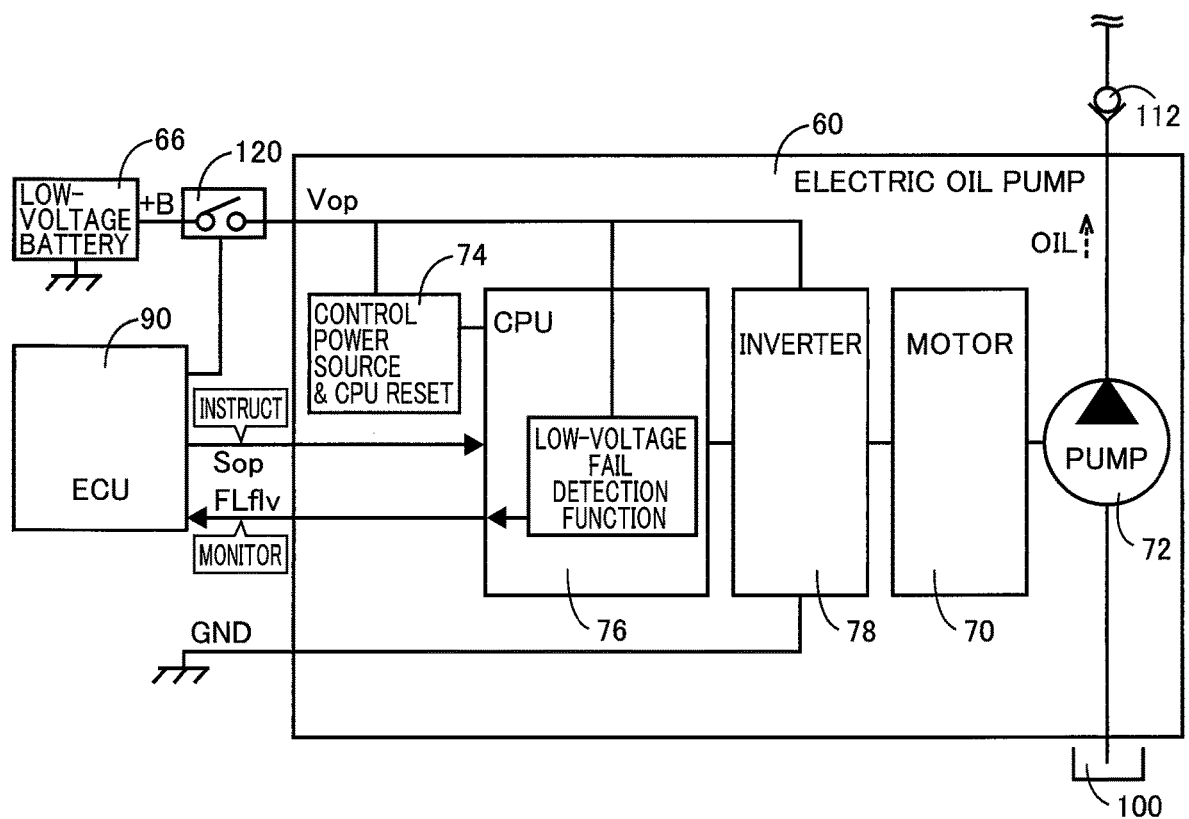
FIG. 3 is a view explaining an internal configuration of an electric oil pump device.

FIG. 3 is a view explaining an internal configuration of the electric oil pump 60. In FIG. 3, the electric oil pump 60 includes a control power source 74, a CPU 76 for electric oil pump, an inverter 78 for electric oil pump, etc., in addition to the motor 70 for electric oil pump and the pump 72 for electric oil pump described above. The low-voltage battery voltage $V_{batlow}$ (see +B in FIG. 3) i.e. the electric oil pump input voltage $V_{op}$, is applied via the electric oil pump relay 120 to the control power source 74 and the inverter 78 for electric oil pump. When the electric oil pump relay 120 is on, the control power source 74 supplies a working voltage of e.g. 5 [V], as an electric oil pump internal control power source voltage i.e. the output voltage of the control power source 74, to the CPU 76 for electric oil pump, based on the electric oil pump input voltage $V_{op}$. The control power source 74 has an electric oil pump internal CPU reset function of initializing the CPU 76 for electric oil pump, i.e., resetting the CPU 76 for electric oil pump, at the start of first operation of the CPU 76 for electric oil pump after power on. The CPU 76 for electric oil pump is connected to the inverter 78 for electric oil pump to control the inverter 78 for electric oil pump, based on an electric oil pump control command signal $S_{op}$ from the electronic control unit 90 that will be described later. The inverter 78 for electric oil pump is connected to the motor 70 for electric oil pump to operate the motor 70 for electric oil pump under control of the CPU 76 for electric oil pump.

The vehicle 10 further includes the electronic control unit 90 including a control device of the vehicle 10. The electronic control unit 90 is configured to include, for example, a so-called microcomputer having a CPU, a RAM, a ROM, an I/O interface, etc., the CPU performing signal processing in accordance with a program previously stored in the ROM while utilizing a temporary storage function of the RAM, to thereby execute various controls of the vehicle 10. The electronic control unit 90 is configured including, if necessary, computers for engine control, for electric motor control, for clutch control, for transmission control, etc.

The electronic control unit 90 receives various signals, etc. (for example, the power switch signal $PS_{on}$, an engine rotation number $N_e$ i.e. the rotation speed of the engine 12, the turbine rotation number $N_t$ equal to the AT input rotation number the AT output rotation number $N_o$ corresponding to the vehicle velocity V, an MG rotation number $N_m$ i.e. the rotation speed of the electric motor MG, an accelerator opening $\theta_{acc}$ i.e. the amount of a driver's accelerator operation indicative of the magnitude of a driver's acceleration operation, a throttle valve opening $\theta_{th}$ i.e. the opening degree of an electronic throttle valve, a brake-on signal Bon i.e. a signal indicative of the state where a brake pedal for actuating wheel brakes is operated by the driver, a battery temperature $TH_{bat}$, a battery charge/discharge current $I_{bat}$, and a battery voltage Vbat of the high-voltage battery 54, a hydraulic oil temperature $TH_{oil}$ i.e. the temperature of hydraulic oil OIL within the oil pressure control circuit 56, the low-voltage battery voltage $V_{batlow}$, etc.) that are respectively based on detection values of various sensors, various devices, etc. (for example, the start button 68, an engine rotation number sensor 80, a turbine rotation number sensor 81, an output rotation number sensor 82, an MG rotation number sensor 83, an accelerator opening sensor 84, a throttle valve opening sensor 85, a brake switch 86, a battery sensor 87, an oil temperature sensor 88, a low-voltage battery sensor 89, etc.) disposed in the vehicle 10.

The electronic control unit 90 calculates a battery charge SOC [%], based on e.g. the battery charge/discharge current $I_{bat}$, the battery voltage Vbat, etc. The battery charge SOC is the amount of charge of the high-voltage battery 54 and is a state-of-charge value i.e. a value indicative of the state of charge of the high-voltage battery 54. The electronic control unit 90 calculates a chargeable power $W_{in}$ [W] and a dischargeable power $W_{out}$ [W] of the high-voltage battery 54, based on e.g. the battery temperature $TH_{bat}$ and the battery charge SOC. The chargeable power $W_{in}$ of the high-voltage battery 54 is a maximum inputtable power specifying the limit of power input to the high-voltage battery 54 and indicates the input limit i.e. charge limit of the high-voltage battery 54. The dischargeable power $W_{out}$ of the high-voltage battery 54 is a maximum outputtable power specifying the limit of power output from the high-voltage battery 54 and indicates the output limit i.e. discharge limit of the high-voltage battery 54.

The electronic control unit 90 outputs various command signals (e.g. an engine control command signal $S_e$ for controlling the engine 12, an MG control command signal $S_m$ for controlling the electric motor MG, a CB oil pressure control command signal $S_{cb}$ for controlling the engagement devices CB, a K0 oil pressure control command signal $S_{k0}$ for controlling the K0 clutch 20, an LU oil pressure control command signal $S_{lu}$ for controlling the LU clutch 40, the electric oil pump control command signal $S_{op}$ for controlling the electric oil pump 60, a starter control command signal $S_{st}$ for controlling the starter motor 62, etc.), respectively, to the devices (e.g. the engine control device 50, the inverter 52, the oil pressure control circuit 56, the electric oil pump 60, the starter motor 62, etc.) disposed in the vehicle 10.

The oil pressure control command signal S will be described by exemplifying the K0 oil pressure control command signal $S_{k0}$. The electronic control unit 90 calculates, as a command value of the K0 oil pressure $PR_{k0}$, a K0 clutch instruction pressure $S_{pk0}$ i.e. an instruction pressure of the K0 clutch 20 for causing the oil pressure control circuit 56 to supply the regulated K0 oil pressure $PR_{k0}$. The instruction pressure is a target pressure instructed by the electronic control unit 90 for hydraulic oil OIL supplied to the engagement devices, the real oil pressure i.e. the actual oil pressure supplied to the engagement devices varying depending on this instruction pressure. The electronic control unit 90 converts the K0 clutch instruction pressure $S_{pk0}$ into a K0 instruction current value $S_{ik0}$ for driving the K0 solenoid $SL_{k0}$. The K0 instruction current value $S_{ik0}$ is an instruction current for a solenoid driver i.e. a drive circuit driving the K0 solenoid $SL_{k0}$, included in the electronic control unit 90. The K0 oil pressure control command signal $S_{k0}$ is a drive current or a drive voltage with which the solenoid driver drives the K0 solenoid $SL_{k0}$ on the basis of the K0 instruction current value $S_{ik0}$. That is, the K0 clutch instruction pressure $S_{pk0}$ is converted into the K0 oil pressure control command signal $S_{k0}$ to be output to the oil pressure control circuit 56. In this embodiment, for convenience, the K0 clutch instruction pressure $S_{pk0}$ is treated as being equivalent to the K0 oil pressure control command signal $S_{k0}$.

In order to implement various controls in the vehicle 10, the electronic control unit 90 includes a power source control unit 92 as power source control means, a clutch control unit 94 as clutch control means, a transmission control unit 96 as transmission control means, and a startup control unit 98 as startup control means.

The power source control unit 92 is a hybrid control unit i.e. hybrid control means that includes both a function as an engine control unit 92a i.e. engine control means controlling the action of the engine 12 and a function as an electric motor control unit 92b i.e. electric motor control means controlling the action of the electric motor MG via the inverter 52, to execute hybrid drive control, etc. of the engine 12 and the electric motor MG by those control functions.

The power source control unit 92 applies the accelerator opening $\theta_{acc}$ and the vehicle velocity V to a drive-demand-amount map for example, to calculate a driver's drive demand amount for the vehicle 10. The drive-demand-amount map represents relationships obtained experimentally or by design in advance and stored, that is, relationships defined in advance. The drive demand amount is, for example, a demanded driving torque $T_{rdem}$ on the driving wheels 14. In other words, the demanded driving torque $T_{rdem}$ [Nm] is a demanded driving power $P_{rdem}$ [W] at the vehicle velocity V at that time. The drive demand amount may also be e.g. a demanded driving force $F_{rdem}$ [N] on the driving wheels 14 or a demanded AT output torque on the transmission output shaft 26. For calculation of the drive demand amount, the AT output rotation number $N_o$ or the like may be used in place of the vehicle velocity V.

The power source control unit 92 calculates a demanded system shaft torque $T_{sysdem}$ for achieving the demanded driving torque $T_{rdem}$, in consideration of the power transmission loss, the accessories loads, the gear ratio $\gamma_{at}$ of the automatic transmission 24, etc. The demanded system shaft torque $T_{sysdem}$ is a demand value of a system shaft torque $T_{sys}$. The system shaft torque $T_{sys}$ is a power transmission shaft torque i.e. a torque on the electric motor coupling shaft 36. The system shaft torque $T_{sys}$ is a torque transmitted via the automatic transmission 24 to the driving wheels 14, of the power source torque $T_{sp}$, that is, a torque used as a driving torque $T_r$. The power source control unit 92 issues the engine control command signal $S_e$ for controlling the engine 12 and the MG control command signal $S_m$ for controlling the electric motor MG so as to achieve the demanded system shaft torque $T_{sysdem}$.

In case that the demanded system shaft torque $T_{sysdem}$ can be covered by only the output of the electric motor MG, the power source control unit 92 establishes a motor drive mode i.e. a BEV drive mode as a drive mode for driving the vehicle 10. The BEV drive mode is an electric drive mode allowing motor running i.e. electric running (=BEV running) in which the vehicle 10 runs using only the electric motor MG as the power source SP with the engine 12 stopping its operation while the K0 clutch 20 is released. On one hand, in case that the demanded system shaft torque $T_{sysdem}$ cannot be covered if not using at least the output of the engine 12, the power source control unit 92 establishes an engine drive mode i.e. an HEV drive mode as the drive mode. The HEV drive mode is a hybrid drive mode allowing hybrid running (=HEV running) i.e. engine running in which the vehicle 10 runs using at least the engine 12 as the power source SP with the K0 clutch 20 engaged. On the other hand, even if the demanded system shaft torque $T_{sysdem}$ can be covered by only the output of the electric motor MG, the power source control unit 92 establishes the HEV drive mode as the drive mode in the case e.g. where the high-voltage battery 54 needs to be charged or where the engine 12, etc. need to be warmed up. The case where the battery 54 needs to be charged includes, for example, the case where the battery charge SOC drops below a specified range, or the case where charging of the battery 54 improves the energy efficiency though the battery charge SOC lies within the specified range.

Using e.g. a shift map representing predefined relationships, the transmission control unit 96 performs shift determination of the automatic transmission 24, and as needed, i.e., according to the result of the shift determination, issues a CB oil pressure control command signal $S_{cb}$ for executing shift control of the automatic transmission 24, to the oil pressure control circuit 56. In the shift control of the automatic transmission 24, the transmission control unit 96 performs shifting of the automatic transmission 24 by switching to the released state of the release-side engagement device of the engagement devices CB and by switching to the engaged state of the engage-side engagement device of the engagement devices CB. The shift map represents predetermined relationships having shift lines for determining shifting of the automatic transmission 24 on two-dimensional coordinates with e.g. the vehicle velocity V and the demanded driving torque $T_{rdem}$ as variables. In the shift map, the vehicle velocity V may be replaced with the AT output rotation number $N_o$ or the like, or the demanded driving torque $T_{rdem}$ may be substituted with the demanded driving force $F_{rdem}$, the accelerator opening $\theta_{acc}$, the throttle valve opening $\theta_{th}$, or the like.

The startup control unit 98 determines the presence or absence of an engine start request i.e. a start request for the engine 12 to switch the control state of the engine 12 from the stop state to the working state. For example, the startup control unit 98 determines whether the engine start request is present, based on whether the demanded system shaft torque $T_{sysdem}$ has increased beyond the range that can be covered by only the output of the electric motor MG during the BEV drive mode, or whether the engine 12, etc. need to be warmed up, or whether the high-voltage battery 54 needs to be charged.

In case that the startup control unit 98 has determined that the engine start request is present, the startup control unit 98 outputs a command for controlling the K0 clutch 20 to execute an engine startup control $CT_{st}$ i.e. start of the engine 12, to the clutch control unit 94. The clutch control unit 94 outputs to the oil pressure control circuit 56 the K0 oil pressure control command signal $S_{k0}$ for controlling the K0 clutch 20 in the released state toward the engaged state so as to be able to obtain the K0 torque $T_{k0}$ for transmitting a cranking torque $T_{cr}$ to the engine 12 side. The cranking torque $T_{cr}$ is a predetermined torque required for cranking of the engine 12 to raise the engine rotation number $N_e$.

In case that the startup control unit 98 has determined that the engine start request is present, the startup control unit 98 outputs a command for controlling the engine 12 and the electric motor MG to execute the engine startup control $CT_{st}$, to the power source control unit 92. The power source control unit 92 esp. the electric motor control unit 92b outputs the MG control command signal $S_{mg}$ for allowing the electric motor MG to generate the cranking torque $T_{cr}$, to the inverter 52, in response to switching of the K0 clutch 20 to the engaged state, i.e., in conjunction with cranking of the engine 12 by the K0 clutch 20.

When cranking the engine 12, a reaction torque occurs accompanying the engagement of the K0 clutch 20. Upon the BEV running, this reaction torque causes a drop in the driving torque $T_r$ due to inertia of the engine 12, etc. during the engine start. For this reason, at the time of cranking of the engine 12, the MG torque $T_m$ increases by the amount of the cranking torque $T_{cr}$ transmitted via the K0 clutch 20. The MG torque $T_m$ increased toward the cranking torque $T_{cr}$ upon the engine startup control $CT_{st}$ is an MG torque $T_m$ for cancelling the reaction torque and is the amount of MG torque $T_m$ that compensates for this reaction torque, i.e., is an MG torque $T_m$ for reaction force compensation. The cranking torque $T_{cr}$ is a K0 torque $T_{k0}$ required for cranking the engine 12 and is an MG torque $T_m$ required for cranking the engine 12 that flows from the electric motor MG side via the K0 clutch 20 to the engine 12 side. The cranking torque $T_{cr}$ is, for example, a certain torque previously defined based on, e.g. specifications of the engine 12, a starting method (starting type) of the engine 12 i.e. the engine starting type, etc.

That is, in the engine startup control $CT_{st}$ during the BEV running, the electric motor MG outputs the MG torque $T_m$ used as the cranking torque $T_{cr}$, in addition to the MG torque $T_m$ used as the driving torque $T_r$. Hence, during the BEV running, the amount of the cranking torque $T_{cr}$ needs to be secured for the engine startup control $CT_{st}$ so as to prevent the driving torque $T_r$ from dropping in the engine startup control $CT_{st}$. Accordingly, the range where the demanded system shaft torque $T_{sysdem}$ can be covered by only the output of the electric motor MG is a torque range obtained by subtracting the amount of the cranking torque $T_{cr}$ from a maximum MG torque $T_{mmax}$ i.e. the maximum outputtable torque of the electric motor MG. The upper limit of the system shaft torque $T_{sys}$ i.e. the MG torque $T_m$ during the BEV running is restricted by the torque obtained by subtracting the cranking torque $T_{cr}$ from the maximum MG torque $T_{mmax}$. The maximum MG torque $T_{mmax}$ is a maximum value of the MG torque $T_m$ that is determined by the dischargeable power $W_{out}$ of the high-voltage battery 54 and/or that is determined by the rating of the electric motor MG.

Figure 4:
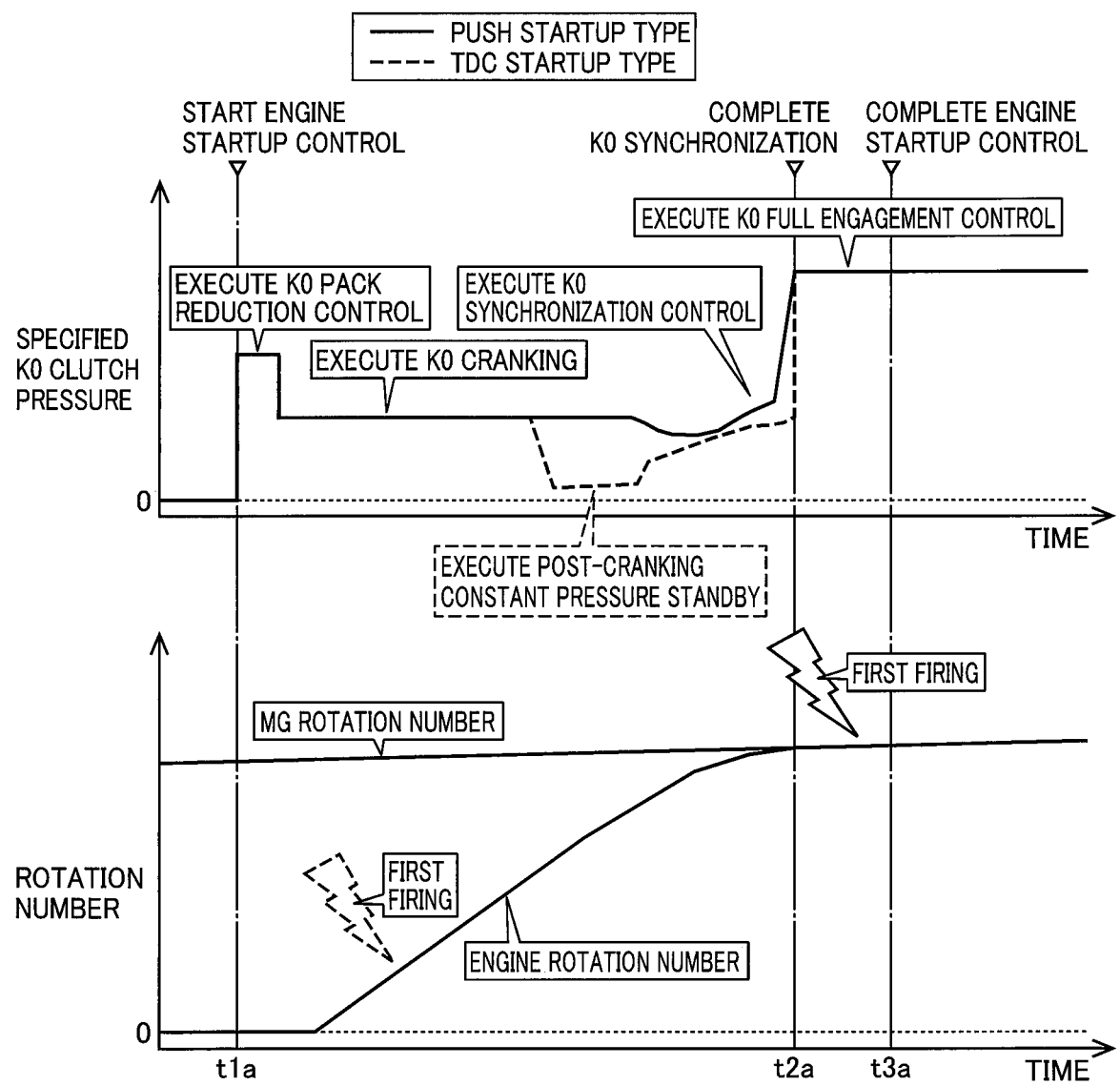
FIG. 4 is a view showing an example of a timechart in case of executing engine startup control.

FIG. 4 is a view showing an example of a timechart in case of executing the engine startup control $CT_{st}$. In FIG. 4, point-in-time t1a indicates a point in time when the engine startup control $CT_{st}$ starts due to determination that an engine start request is present accompanying the driver's further depression of an accelerator pedal during the BEV running for example. After the start of the engine startup control $CT_{st}$, K0 pack reduction control i.e. pack clearance reduction control of the K0 clutch 20 is carried out. The pack reduction control is control putting the friction engagement device into a pack reduction completion state i.e. a state where the pack reduction has completed with the pack clearance reduced between friction plates of the friction engagement device. The pack reduction completion state of the friction engagement device is a state where the friction engagement device begins to have the torque capacity if the oil pressure supplied to the friction engagement device is increased from the pack reduction completion state. In order to crank the engine 12, after ending of the K0 pack reduction control, k0 cranking is executed that is cranking by the K0 clutch 20 transmitting the cranking torque $T_{cr}$ to the engine 12 side.

After raise of the engine rotation number $N_e$ by the k0 cranking, k0 synchronization control is executed that is synchronization control by the K0 clutch 20 for synchronizing the engine rotation number $N_e$ and the MG rotation number $N_m$ (see solid lines of FIG. 4). The engine rotation number $N_e$ is the rotation number of the engine coupling shaft 34 and is equal to the input rotation number of the K0 clutch 20. That is, synchronization between the engine rotation number $N_e$ and the MG rotation number $N_m$ is equivalent to synchronization between the input rotation number and the output rotation number of the K0 clutch 20. When K0 synchronization i.e. synchronization between the input rotation number and the output rotation number of the K0 clutch 20 is completed (see point-in-time t2a), that is, when K0 engagement i.e. switching of the K0 clutch 20 to the engaged state is completed, the engine ignition etc. are started so that the engine 12 undergoes first firing (see solid lines of FIG. 4). After the completion of the K0 synchronization, K0 full engagement control is executed for keeping the fully engaged state of the K0 clutch 20 (see after point-in-time ta2), after which the engine startup control $CT_{st}$ is completed at the time when stable output of the engine torque $T_e$ has been secured in accordance with the engine control command signal $S_e$ (see point-in-time t3a). In this embodiment, the engine startup type of first firing and starting the engine 12 after raising the engine rotation number $N_e$ up to the K0 synchronization by the K0 clutch 20 and the electric motor MG is referred to as push starting method i.e. PUSH startup type. The PUSH startup type is a starting method of raising the engine rotation number Ne by the cranking torque $T_{cr}$ and firing the engine after the completion of the K0 synchronization, that is, a starting method of raising the engine rotation number $N_e$ by the K0 clutch 20 in the fuel-cut state, to ignite after the completion of the K0 synchronization.

In this embodiment, as indicated by a broken line of FIG. 4, another engine startup type different from the PUSH startup type (see solid lines in FIG. 4) may be executed. In the broken line of FIG. 4, when the engine rotation number $N_e$ is raised by the k0 cranking, the engine ignition etc. are early started so that the engine 12 is fired before the K0 synchronization. As shown in the broken line of FIG. 4, to wait switching of the K0 clutch 20 to the engaged state after ending of the k0 cranking, post-cranking constant pressure standby is executed that drops the K0 torque $T_{k0}$ below the cranking torque $T_{cr}$ to keep it at a fixed torque $T_{k0f}$. A specified K0 clutch pressure $S_{pk0}$ at the time of the post-cranking constant pressure standby is, for example, substantially the same as the K0 oil pressure $PR_{k0}$ keeping the K0 clutch 20 at the pack reduction completion state or the slip state and is the specified K0 clutch pressure $S_{pk0}$ for achieving the K0 torque $T_{k0}$ that does not become a disturbance of the full firing of the engine 12. During executing the post-cranking constant pressure standby, the engine rotation number $N_e$ is raised exclusively by the combustion torque of the engine 12, not by the K0 torque $T_{k0}$. During the execution of the post-cranking constant pressure standby, when self-rotation by the firing of the engine 12 becomes stable, that is, when the engine 12 enters the fully fired state, the K0 synchronization control is executed to complete the K0 synchronization. The K0 synchronization control may be started after the engine rotation number $N_e$ reaches the MG rotation number $N_m$. Accordingly, the engine rotation number $N_e$ after the first firing of the engine 12 is raised toward the K0 synchronization by at least the engine torque $T_e$. In this embodiment, the engine startup type first firing and starting the engine 12 before the K0 synchronization, for example, at early timing during the k0 cranking is referred to as an early starting method i.e. a TDC startup type. The TDC startup type is a starting method of firing the engine 12 in the process up to the completion of the K0 synchronization and, after firing of the engine 12, raising the engine rotation number $N_e$ by at least the engine torque $T_e$. Although the PUSH startup type indicated by the solid lines and the TDC startup type indicated by the broken line originally have different durations of the engine startup control $CT_{st}$, they are assumed to be the same length for convenience in FIG. 4.

Referring to FIG. 4, upon the engine startup control $CT_{st}$, the startup control unit 98 performs clutch startup control $CT_{stclt}$ of: controlling the K0 clutch 20 to transmit the cranking torque $T_{cr}$; controlling the electric motor MG to output the cranking torque $T_{cr}$ in liaison with the cranking by the K0 clutch 20; and controlling the engine 12 to start the operation in liaison with the cranking by the K0 clutch 20. The startup control unit 98 selectively executes the clutch startup control $CT_{stclt}$ by the PUSH startup type and the clutch startup control $CT_{stclt}$ by the TDC startup type.

The TDC startup type is superior in energy efficiency and startup responsiveness to the PUSH startup type, due to the raise of the engine rotation number $N_e$ by the self-rotation of the engine 12, which leads to a required cranking torque $T_{cr}$ reduced as compared with the PUSH startup type. On the other hand, the PUSH startup type is easy to have a less starting shock than the TDC startup type has. For this reason, the startup control unit 98 performs the clutch startup control $CT_{stclt}$ by the PUSH startup type in a range where the starting shock is apt to be problematic, for example, a region where the MG rotation number $N_m$ is low, or when the shock sensitivity is apt to increase, for example, when the automatic transmission 24 is at the low-gear stage.

At the time of the engine startup control $CT_{st}$, the required cranking torque $T_{cr}$ tends to increase e.g. when the engine 12 is cold. Hence, in case of starting the engine 12 for the first time after the system activation of the vehicle 10, i.e., after the transition of the vehicle power source state from the OFF state to IG-ON state through the operation of the start button 68, the clutch startup control $CT_{stclt}$ may possibly be difficult to perform. At the time of the engine startup control $CT_{st}$, proper control of the electric motor MG becomes difficult to perform, for example, when the chargeable power $W_{out}$ of the high-voltage battery 54 is small or when power supply from the high-voltage battery 54 is difficult. Consequently, the clutch startup control $CT_{stclt}$ may be difficult to perform in the case e.g. where the vehicle 10 lies in a predefined ultralow temperature environment in which it is determined that the electric motor MG cannot be properly controlled.

The vehicle 10 includes the starter motor 62. In consequence, upon the engine startup control $CT_{st}$, the startup control unit 98 can perform the clutch startup control $CT_{stclt}$ and perform starter startup control $CT_{stmtr}$ that is start of the engine 12 using the starter motor 62. In case that the clutch startup control $CT_{stclt}$ tat is difficult to perform, the startup control unit 98 performs the starter startup control $CT_{stmtr}$.

After switching the starter relay 122 to the on state during the starter startup control $CT_{stmtr}$, the startup control unit 98 issues a starter control command signal $S_{st}$ for operating the starter motor 62 with the starter motor 62 being supplied with electric power from the low-voltage battery 66, to crank the engine 12 by the starter motor 62. When the engine 12 becomes fully fired, the startup control unit 98 cancels the starter control command signal $S_{st}$ to stop the cranking by the starter motor 62.

To transmit the power of the engine 12 to the driving wheels 14 side, the K0 clutch 20 needs to be switched to the engaged state. Since at this time the MOP 58 is not in operation, the electric oil pump 60 needs to be operated to supply hydraulic oil OIL inducing the K0 oil pressure $PR_{k0}$. After switching the electric oil pump relay 120 to the on state during the starter startup control $CT_{stmtr}$, the startup control unit 98 issues an electric oil pump control command signal $S_{op}$ for operating the electric oil pump motor 70 with the electric oil pump 60 being supplied with electric power from the low-voltage battery 66, to allow the electric oil pump 60 to discharge hydraulic oil OIL. After starting discharge of hydraulic oil OIL by the electric oil pump 60 when the startup control unit performs the starter startup control $CT_{stmtr}$, the startup control unit 98 outputs to the clutch control unit 94 a command for supplying the K0 clutch 20 with the K0 oil pressure $PR_{k0}$ originating from hydraulic oil OIL, to switch the K0 clutch 20 from the released state to the engaged state.

In case when the startup control unit performs the starter startup control $CT_{stmtr}$, the low-voltage battery voltage $V_{bat-low}$ may drop at the time of cranking by the starter motor 62. Since the low-voltage battery 66 supplies electric power also to the electric oil pump 60, the electric oil pump input voltage $V_{op}$ may drop during the starter startup control $CT_{stmtr}$ to impede normal operation of the electric oil pump 60. To address this, it is conceived to use the electric oil pump 60 that normally operates even if the electric oil pump input voltage $V_{op}$ drops. In this case, there occurs a problem that it is hard to reduce the size of the electric oil pump 60 due to e.g. addition of high-performance devices such as disposing a boost power supply circuit inside the electric oil pump 60 or imparting a function capable of working at low voltage to the inverter 78 for electric oil pump.

This embodiment thus employs a configuration not using the high-performance devices inside the electric oil pump 60, by allowing the electric oil pump 60 to detect the low-voltage fail state in a controlled manner if the electric oil pump input voltage $V_{op}$ drops during the starter startup control $CT_{stmtr}$. The low-voltage fail state is, for example, a state where the electric oil pump input voltage $V_{op}$ is less a low-voltage fail threshold value $V_{fail}$ that will be described later. The electric oil pump 60 notifies the electronic control unit 90 of detection of the low-voltage fail state, after which when the low-voltage battery voltage $V_{batlow}$ recovers from the dropped state, the detection of the low-voltage fail state is cancelled allowing the electric oil pump 60 to recover to the normally operable state. The electronic control unit 90 does not issue a command to activate the electric oil pump 60 while the low-voltage fail state is detected by the electric oil pump 60 during cranking the engine 12. The electronic control unit 90 is designed to issue a command to activate the electric oil pump 60 after the low-voltage battery voltage $V_{batlow}$ becomes stable after the completion of the cranking of the engine 12. This eliminates the need to use the high-performance devices inside the electric oil pump 60, leading to the size reduction of the electric oil pump 60.

Referring back to FIG. 3, the CPU 76 for electric oil pump has a function to monitor the electric oil pump input voltage $V_{op}$. For example, the CPU 76 for electric oil pump determines whether the electric oil pump input voltage $V_{op}$ is higher than or equal to the low-voltage fail threshold value $V_{fail}$ as a fixed voltage. That is, the CPU 76 for electric oil pump has a low-voltage fail detection function to detect whether the electric oil pump input voltage $V_{op}$ is less than the low-voltage fail threshold value $V_{fail}$. The CPU 76 for electric oil pump turns off an electric oil pump low-voltage fail flag $FL_{flv}$ if the electric oil pump input voltage $V_{op}$ is higher than or equal to the low-voltage fail threshold value $V_{fail}$, whereas it turns on the electric oil pump low-voltage fail flag $FL_{flv}$ if the electric oil pump input voltage $V_{op}$ is less than the low-voltage fail threshold value $V_{fail}$. The low-voltage fail threshold value $V_{fail}$ is, for example, a pre-defined lower limit value for securing normal operation of the electric oil pump 60. The electronic control unit 90 is fed with the electric oil pump low-voltage fail flag $FL_{flv}$ from the electric oil pump 60 (see FIGS. 1 and 3).

Referring back to FIG. 1, upon performing the starter startup control $CT_{stmtr}$, the startup control unit 98 determines whether the electric oil pump low-voltage fail flag $FL_{flv}$ is turned off after the completion of the cranking by the starter motor 62. Determining whether the electric oil pump low-voltage fail flag $FL_{flv}$ is turned off, is equivalent to determining whether the electric oil pump input voltage $V_{op}$ is higher than or equal to the low-voltage fail threshold value $V_{fail}$. In this manner, the startup control unit 98 determines whether the electric oil pump input voltage $V_{op}$ is higher than or equal to the low-voltage fail threshold value $V_{fail}$, by determining whether the electric oil pump 60 has detected that the electric oil pump input voltage $V_{op}$ is higher than or equal to the low-voltage fail threshold value $V_{fail}$. The startup control unit 98 issues the electric oil pump control command signal $S_{op}$ for starting discharge of hydraulic oil OIL by the electric oil pump 60, after the electric oil pump low-voltage fail flag $FL_{flv}$ has been determined to be off, that is, after the electric oil pump input voltage $V_{op}$ has been determined to be higher than or equal to the low-voltage fail threshold value $V_{fail}$, after the completion of cranking by the starter motor 62. Since the electric oil pump input voltage $V_{op}$ is the low-voltage battery voltage $V_{batlow}$ when the electric oil pump relay 120 is on, determining that the electric oil pump input voltage $V_{op}$ is higher than or equal to the low-voltage fail threshold value $V_{fail}$ is equivalent to determining that the low-voltage battery voltage $V_{batlow}$ is higher than or equal to the low-voltage fail threshold value $V_{fail}$.

Specifically, after booting the system of the vehicle 10, the startup control unit 98 switches the starter relay 122 to the on state and switches the electric oil pump relay 120 to the on state. Subsequently, the startup control unit 98 issues the starter control command signal $S_{st}$ for operating the starter motor 62. In this manner, the startup control unit 98 starts the startup of the engine 12 with each of the starter motor 62 and the electric oil pump 60 being supplied with electric power from the low-voltage battery 66.

The startup control unit 98 determines whether the engine 12 has been fully fired, i.e., whether the startup of the engine 12 has been completed. Since the cranking by the starter motor 62 is stopped when the engine 12 is fully fired, determining whether the startup of the engine 12 has been completed is equivalent to determining whether the cranking by the starter motor 62 has been completed.

If the startup control unit determines that the startup of the engine 12 has been completed, the startup control unit 98 determines whether the electric oil pump 60 has recovered from the low-voltage fail state, i.e., whether the electric oil pump low-voltage fail flag $FL_{flv}$ is off.

If the startup control unit determines that the electric oil pump 60 has recovered from the low-voltage fail state, the startup control unit 98 issues the electric oil pump control command signal $S_{op}$ for operating the electric oil pump 60 i.e. the motor 70 for electric oil pump. In this manner, if the start up control unit determines that the electric oil pump input voltage $V_{op}$ is higher than or equal to the low-voltage fail threshold value $V_{fail}$ after the completion of the cranking by the starter motor 62, the startup control unit 98 starts discharge of hydraulic oil OIL by the electric oil pump 60. Afterward, the startup control unit 98 outputs a command for switching the K0 clutch 20 from the released state to the engaged state, to the clutch control unit 94.

Figure 5:
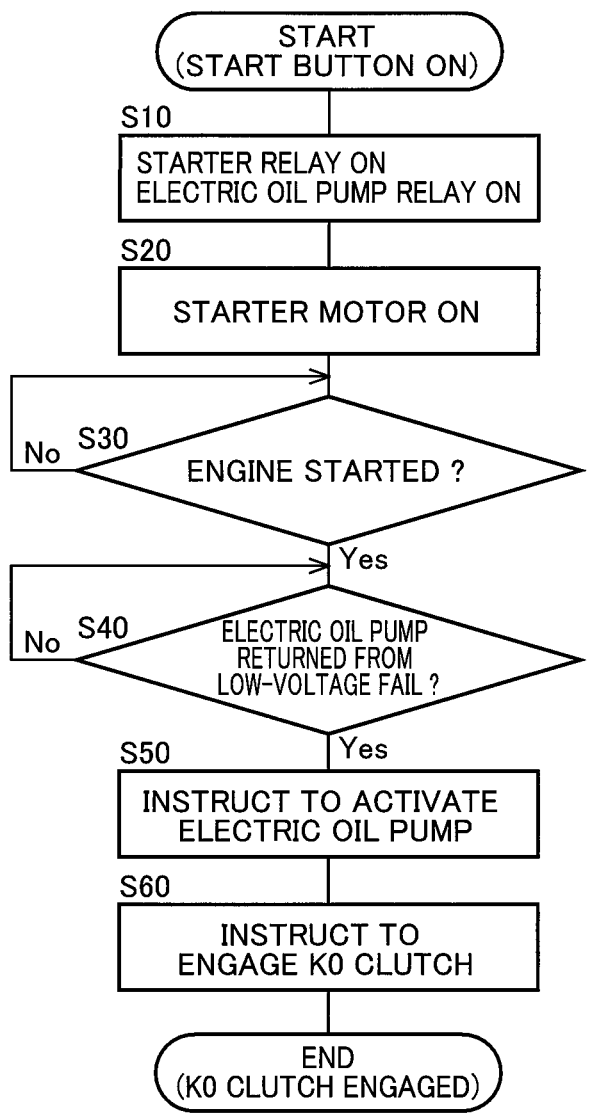
FIG. 5 is a flowchart explaining a principal part of control actions of an electronic control unit, the flowchart explaining control actions for achieving the size reduction of the electric oil pump device while dealing with the engine startup using a starter motor.
Figure 6:
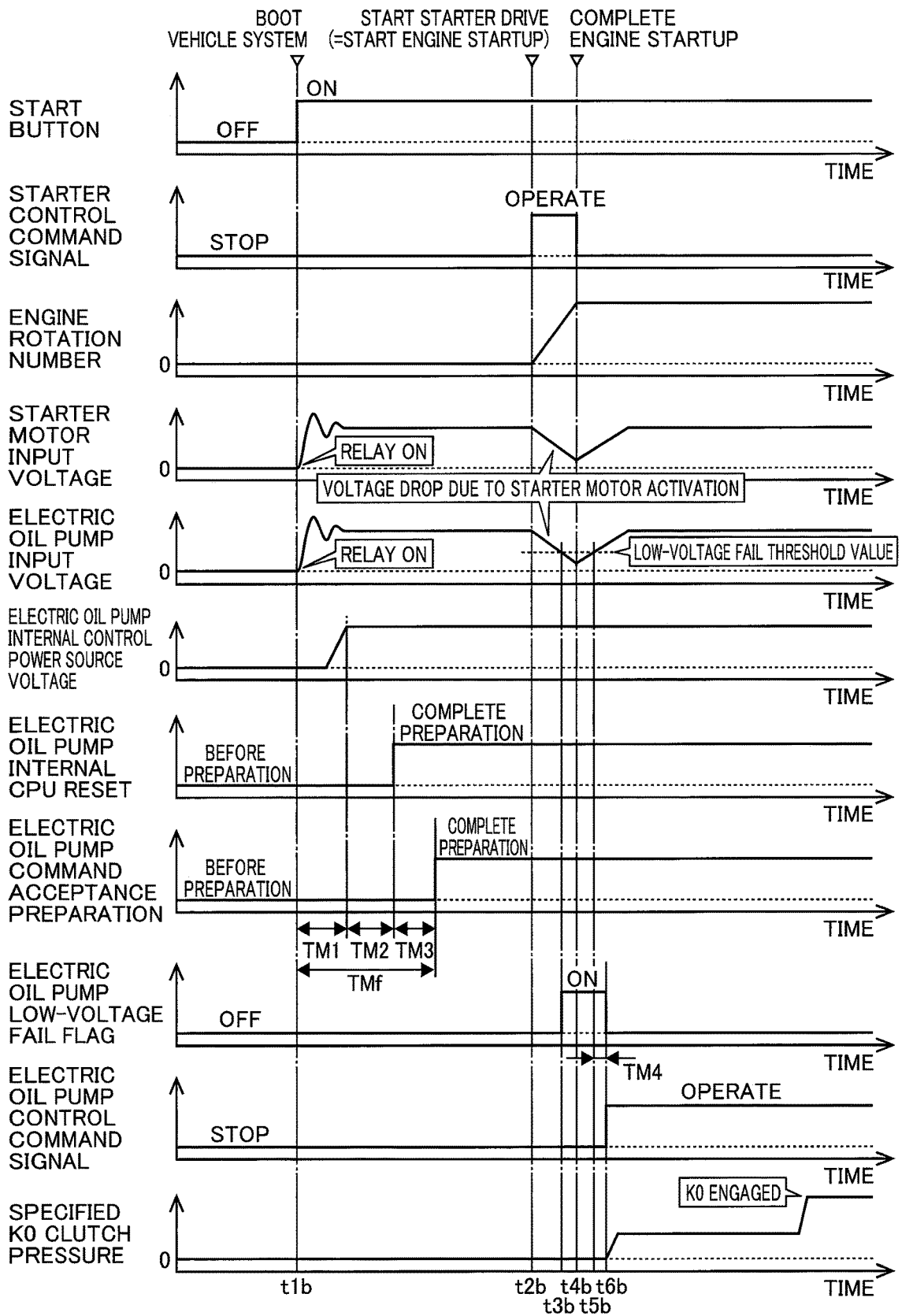
FIG. 6 is a view showing an example of a timechart in case of executing the control actions shown in the flowchart of FIG. 5.

FIG. 5 is a flowchart explaining a principal part of control actions of the electronic control unit 90, the flowchart explaining control actions for achieving the size reduction of the electric oil pump 60 while dealing with the startup of the engine 12 using the starter motor 62, the flowchart being executed after booting the system of the vehicle 10 through operation of the start button 68 for example. FIG. 6 is a view showing an example of a time chart in case of executing the control actions shown in the flowchart of FIG. 5.

In FIG. 5, steps of the flowchart correspond to the functions of the startup control unit 98. At step S10 (hereinafter, the term "step" will be omitted), the starter relay 122 is switched on and the electric oil pump relay 120 is switched on. Then at S20, the starter control command signal $S_{st}$ for activating the starter motor 62 is issued. Then at S30, it is determined whether the startup of the engine 12 has been completed. If determination at S30 is negative, S30 is repeatedly executed. If determination at S30 is affirmative, it is determined at step S40 whether the electric oil pump 60 has recovered from the low-voltage fail state. If determination at S40 is negative, S40 is repeatedly executed. If determination at S40 is affirmative, the electric oil pump control command signal $S_{op}$ for activating the electric oil pump 60 i.e. the motor 70 for electric oil pump step is issued at S50. A command for switching the K0 clutch 20 from the released state to the engaged state is then issued at S60. When switching of the K0 clutch 20 to the engaged state is thereafter completed, this routine comes to an end.

FIG. 6 is a view showing an example of a timechart in case of executing the starter startup control $CT_{stmtr}$ when booting the system of the vehicle 10. In FIG. 6, point-in-time t1b indicates a point in time when the system of the vehicle 10 is booted. Booting the system of the vehicle 10 brings about switching of the starter relay 122 to the on state and switching of the electric oil pump relay 120 to the on state. Switching of the electric oil pump relay 120 to the on state activates the electric oil pump 60. A fixed preparation time TMf (=TM1+TM2+TM3) is needed for the electric oil pump 60 to reach the state where it can accept a command from the electronic control unit 90 after the activation of the electric oil pump 60. TM1 is a time from a point in time of switching the electric oil pump relay 120 to the on state up to a point in time when the electric oil pump internal control power source voltage reaches an operating voltage of the CPU 76 for electric oil pump. TM2 is a time from the point in time when the electric oil pump internal control power source voltage reaches the operating voltage up to a point in time when reset of the CPU 76 for electric oil pump is completed, i.e., a point in time when the CPU 76 for electric oil pump completes preparation for operation. TM3 is a time from the point in time when the CPU 76 for electric oil pump is ready for operation up to a point in time when the CPU 76 for electric oil pump is ready to accept a command from the electronic control unit 90. A fixed preparation time $TM_f$ is a time similar to the system boot time in the publicly known electronic control unit or CPU.

The starter motor 62 is thereafter activated in response to a command from the electronic control unit 90, to start cranking the engine 12 (see point-in-time t2b). At this time, cranking causes drop in the low-voltage battery voltage $V_{batlow}$, and when the electric oil pump input voltage $V_{op}$ becomes lower than the low-voltage fail threshold value $V_{fail}$, the electric oil pump 60 recognizes it as the low-voltage fail state, to send the electric oil pump low-voltage fail flag $F_{Lflv}$ in on state to the electronic control unit 90 (see point-in-time t3b and subsequent points in time). After completion of cranking of the engine 12 (see point-in-time t4b), when the electric oil pump input voltage $V_{op}$ is higher than or equal to the low-voltage fail threshold value $V_{fail}$ as a result of rise of the low-voltage battery voltage $V_{batlow}$ (see point-in-time t5b), the electric oil pump 60 recovers from the low-voltage fail state. At this time, the electric oil pump 60 turns off the electric oil pump low-voltage fail flag $FL_{flv}$ to notify the electronic control unit 90 of the recovery from the low-voltage fail state. The electric oil pump 60 may turn off the electric oil pump low-voltage fail flag $FL_{flv}$ the instant that the electric oil pump input voltage $V_{op}$ becomes higher than or equal to the low-voltage fail threshold value $V_{fail}$. Alternatively, as shown in FIG. 6, the electric oil pump 60 may turn off the electric oil pump low-voltage fail flag $FL_{flv}$ after the lapse of a predetermined recovery delay time TM4 from a point in time when the electric oil pump input voltage $V_{op}$ becomes higher than or equal to the low-voltage fail threshold value $V_{fail}$ (see point-in-time t6b). The predetermined recovery delay time TM4 is a previously defined delay time for determining e.g. that the electric oil pump input voltage $V_{op}$ has securely become higher than or equal to the low-voltage fail threshold value $V_{fail}$. After the completion of cranking of the engine 12, the electronic control unit 90 verifies that the electric oil pump low-voltage fail flag $FL_{flv}$ is off, to issue a command for activating the electric oil pump 60 to switch the K0 clutch 20 to the engaged state (see point-in-time t6b or thereafter).

Referring to FIG. 6, the startup control unit 98 determines whether the electric oil pump input voltage $V_{op}$ is higher than or equal to the low-voltage fail threshold value $V_{fail}$ after the completion of cranking by the starter motor 62, in the state where the fixed preparation time $TM_f$ needed to become ready for activation of the electric oil pump 60 has elapsed from the point in time of starting power supply from the low-voltage battery voltage $V_{batlow}$ to the electric oil pump 60.

As described above, according to this embodiment, the starter startup control $CT_{stmtr}$ to start discharge of hydraulic oil OIL by the electric oil pump 60 is performed after the low-voltage battery voltage $V_{batlow}$ or the electric oil pump input voltage $V_{op}$ has been determined to be higher than or equal to the low-voltage fail threshold value $V_{fail}$ after the completion of cranking by the starter motor 62. As a result, in case that the low-voltage battery voltage $V_{batlow}$ drops accompanying the cranking, the electric oil pump 60 can be normally activated without arranging the high-performance devices capable of working upon the voltage drop inside the electric oil pump 60. It is thus possible to achieve the size reduction of the electric oil pump 60 while dealing with the startup of the engine 12 using the starter motor 62.

According to this embodiment, when the starter startup control $CT_{stmtr}$ is performed, the K0 oil pressure $PR_{k0}$ originating from hydraulic oil OIL is supplied to the K0 clutch 20 after starting discharge of hydraulic oil OIL by the electric oil pump 60, to switch the K0 clutch 20 from the released state to the engaged state, consequently making it possible to become ready for start of the vehicle while achieving the size reduction of the electric oil pump 60.

According to this embodiment, startup of the engine 12 is started with the starter motor 62 and the electric oil pump 60 each being supplied with electric power from the low-voltage battery 66, and discharge of the hydraulic oil OIL is started by the electric oil pump 60 in case that it is determined that the electric oil pump input voltage $V_{op}$ is higher than or equal to the low-voltage fail threshold value $V_{fail}$ after the completion of cranking by the starter motor 62, whereupon the electric oil pump 60 is already supplied with electric power at the point in time of the completion of cranking, so that discharge of hydraulic oil OIL is started the instant that the electric oil pump input voltage $V_{op}$ becomes higher than or equal to the low-voltage fail threshold value $V_{fail}$. As a result, in case that K0 oil pressure $PR_{k0}$ originating from hydraulic oil OIL is supplied to the K0 clutch 20 to switch the K0 clutch 20 from the released state to the engaged state, rapid engagement of the K0 clutch 20 is achieved leading to improved responsiveness for vehicle start.

According to this embodiment, it is determined whether the electric oil pump input voltage $V_{op}$ is higher than or equal to the low-voltage fail threshold value $V_{fail}$ after the completion of cranking by the starter motor 62, in the state where the fixed preparation time $TM_f$ needed to be ready for activation of the electric oil pump 60 has elapsed from the point in time of starting power supply from the low-voltage battery voltage $V_{batlow}$ to the electric oil pump 60, whereupon discharge of hydraulic oil OIL is started, without waiting the lapse of the fixed preparation time $TM_f$, instantly the electric oil pump input voltage $V_{op}$ becomes higher than or equal to the low-voltage fail threshold value $V_{fail}$. This enables the time from the start of startup of the engine 12 to the completion of engagement of the K0 clutch 20 to be shortened.

According to this embodiment, it is determined whether the electric oil pump input voltage $V_{op}$ is higher than or equal to the low-voltage fail threshold value $V_{fail}$, based on the determination of whether the electric oil pump 60 has detected that the electric oil pump input voltage $V_{op}$ is higher than or equal to the low-voltage fail threshold value $V_{fail}$, thus eliminating the need to dispose the high-performance devices capable of working upon the voltage drop inside the electric oil pump 60.

According to this embodiment, the starter startup control $CT_{stmtr}$ is performed in case that the clutch startup control $CT_{stclt}$ is difficult to perform, thereby rendering it possible to achieve the size reduction of the electric oil pump 60 while dealing with the startup of the engine 12 using the starter motor 62, different from the startup of the engine 12 usually done.

In this embodiment, the case where the clutch startup control $CT_{stclt}$ is difficult to perform means the case where the engine 12 is started up for the first time after activation of the vehicle 10, whereupon proper startup of the engine 12 can be ensured prior to the completion of warming up.

In this embodiment, the case where the clutch startup control $CT_{stclt}$ is difficult to perform means the case where the vehicle 10 lies in the predefined ultralow temperature environment in which proper control of the electric motor MG is determined to be difficult to perform, so that the engine 12 can be properly started up under the ultralow temperature environment.

Another embodiment of the present invention will then be described. In the following description, same reference numerals are imparted to parts common to the embodiments, which will not again be described.

Second Embodiment

In the first embodiment described above, upon performing the starter startup control $CT_{stmtr}$, the engine 12 was cranked by the starter motor 62 with the starter motor 62 and the electric oil pump 60 each being supplied with electric power. In case of the above-described first embodiment, when the electric oil pump 60 detects the low-voltage fail state accompanying the drop in the low-voltage battery voltage $V_{batlow}$, the motor 70 for electric oil pump cannot work until the low-voltage fail state is cancelled, and the motor 70 for electric oil pump starts to work after the electric oil pump 60 recovers to the normally operable state.

In this embodiment, upon performing the starter startup control $CT_{stmtr}$, the electric oil pump relay 120 remains off until the low-voltage battery voltage $V_{batlow}$ recovers to a specified value or above after the completion of cranking of the engine 12 by the starter motor 62, thereby preventing the electric oil pump 60 from generating the low-voltage fail state. In case of this embodiment, configuration is such that the electric oil pump relay 120 is switched on to activate the electric oil pump 60 after recovery of the low-voltage battery voltage $V_{batlow}$ after the completion of cranking, consequently achieving the configuration not arranging the high-performance devices within the interior of the electric oil pump 60.

That is, in this embodiment, the startup control unit 98 issues the electric oil pump control command signal $S_{op}$ for starting discharge of hydraulic oil OIL by the electric oil pump 60, after determining that the low-voltage battery voltage $V_{batlow}$ is higher than or equal to the low-voltage fail threshold value $V_{fail}$ after the completion of cranking by the starter motor 62. At this time, the electric oil pump relay 120 is switched on after recovery of the low-voltage battery voltage $V_{batlow}$. In this manner, the startup control unit 98 starts the startup of the engine 12 with the starter motor 62 being supplied with electric power from the low-voltage battery 66, and, if the startup control unit determines that the low-voltage battery voltage $V_{batlow}$ is higher than or equal to the low-voltage fail threshold value $V_{fail}$ after the completion of cranking by the starter motor 62, the startup control unit 98 starts the supply of electric power from the low-voltage battery 66 to the electric oil pump 60, to start discharge of hydraulic oil OIL by the electric oil pump 60.

Specifically, the startup control unit 98 switches the starter relay 122 to the on state after booting the system of the vehicle 10. The electric oil pump relay 120 remains off so as to prevent the electric oil pump 60 from falling into the low-voltage fail state as a result of drop in the low-voltage battery voltage $V_{batlow}$ arising from cranking by the starter motor 62.

Afterward, the startup control unit 98 issues the starter control command signal $S_{st}$ for activating the starter motor 62. The startup control unit 98 starts the startup of the engine 12 with the electric oil pump 60 being supplied with no electric power from the low-voltage battery 66.

If the startup control unit determines that the startup of the engine 12 is completed, the startup control unit 98 determines whether the low-voltage battery voltage $V_{batlow}$ is higher than or equal to the low-voltage fail threshold value $V_{fail}$.

If the startup control unit determines that the low-voltage battery voltage $V_{batlow}$ is higher than or equal to the low-voltage fail threshold value $V_{fail}$, the startup control unit 98 switches the electric oil pump relay 120 to the on state. Subsequently, the startup control unit 98 determines whether the electric oil pump 60 is not abnormal, i.e., whether an electric oil pump low-voltage fail flag $FL_{flv}$, is off. Abnormality of the electric oil pump 60 includes plural types of electric oil pump abnormalities such as: an abnormality that the electric oil pump 60 is in the low-voltage fail state, i.e., an abnormality that the electric oil pump fail flag $FL_{fop}$ is on; an abnormality that the electric oil pump 60 has an defective internal function; and a hardware failure such as malfunction of the motor 70 for electric oil pump. If it has turned out by the self-diagnosis function that none of the plural types of electric oil pump abnormalities occurs, the electric oil pump 60 turns off the electric oil pump fail flag $FL_{fop}$. If it has turned out by the self-diagnosis function that at least one of the plural types of electric oil pump abnormalities occurs, the electric oil pump 60 turns on the electric oil pump fail flag $FL_{fop}$. Accordingly, in this embodiment, the electronic control unit 90 is fed with the electric oil pump fail flag $FL_{fop}$ from the electric oil pump 60.

As described in the above first embodiment, the fixed preparation time $TM_f$ is needed for the electric oil pump 60 to reach the state where it can accept a command from the electronic control unit 90 after activating the electric oil pump 60 by switching the electric oil pump relay 120 to the on state. The fixed preparation time $TM_f$ is the time required only for the electric oil pump 60. For this reason, an on signal or an off signal of the electric oil pump fail flag $FL_{fop}$ is issued from the electric oil pump 60 at a point in time when the CPU 76 for electric oil pump has been ready to accept the command from the electronic control unit 90.

If the startup control unit determines that the electric oil pump 60 is not abnormal, the startup control unit 98 issues the electric oil pump control command signal $S_{op}$ for activating the electric oil pump 60 i.e. the motor 70 for electric oil pump. In this manner, if the startup control unit determines that the electric oil pump 60 is in the state where its normal operation is possible after the completion of cranking by the starter motor 62, the startup control unit 98 starts discharge of hydraulic oil OIL by the electric oil pump 60. Subsequently, the startup control unit 98 outputs a command for switching the K0 clutch 20 from the released state to the engaged state, to the clutch control unit 94.

Figure 7:
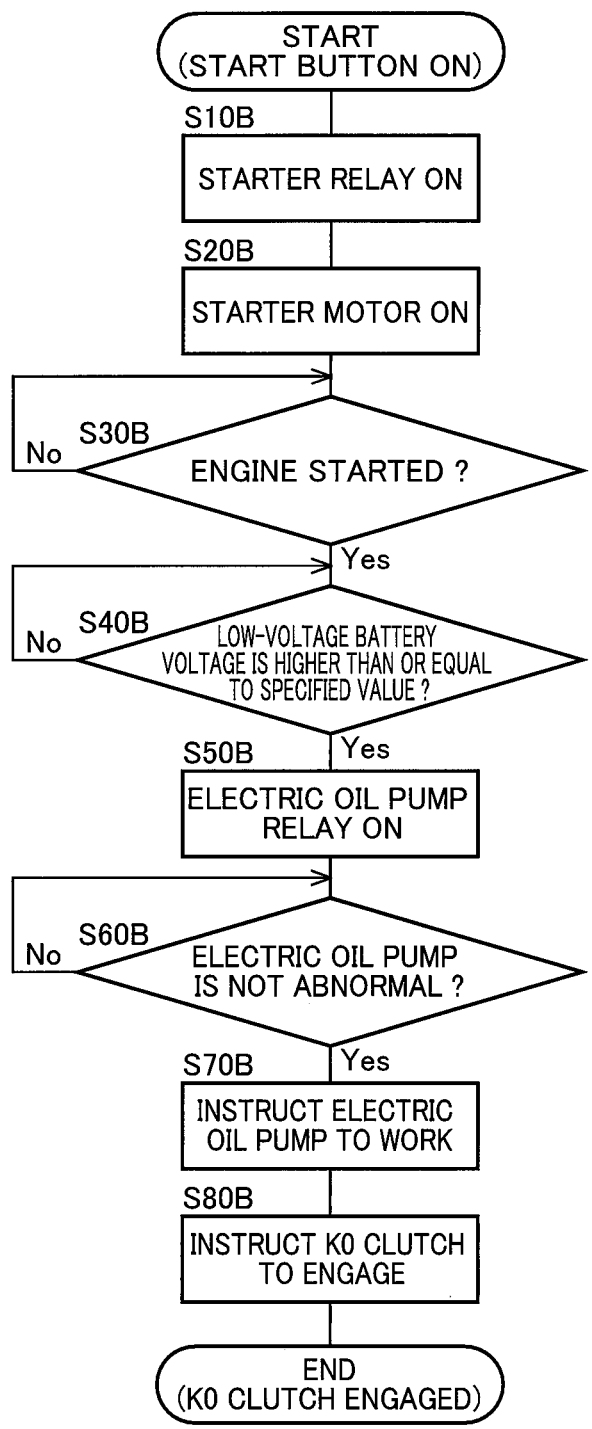
FIG. 7 is a flowchart explaining a principal part of control actions of the electronic control unit, the flowchart explaining control actions for achieving the size reduction of the electric oil pump device while dealing with the engine startup using the starter motor, the flowchart showing another embodiment different from FIG. 5.
Figure 8:
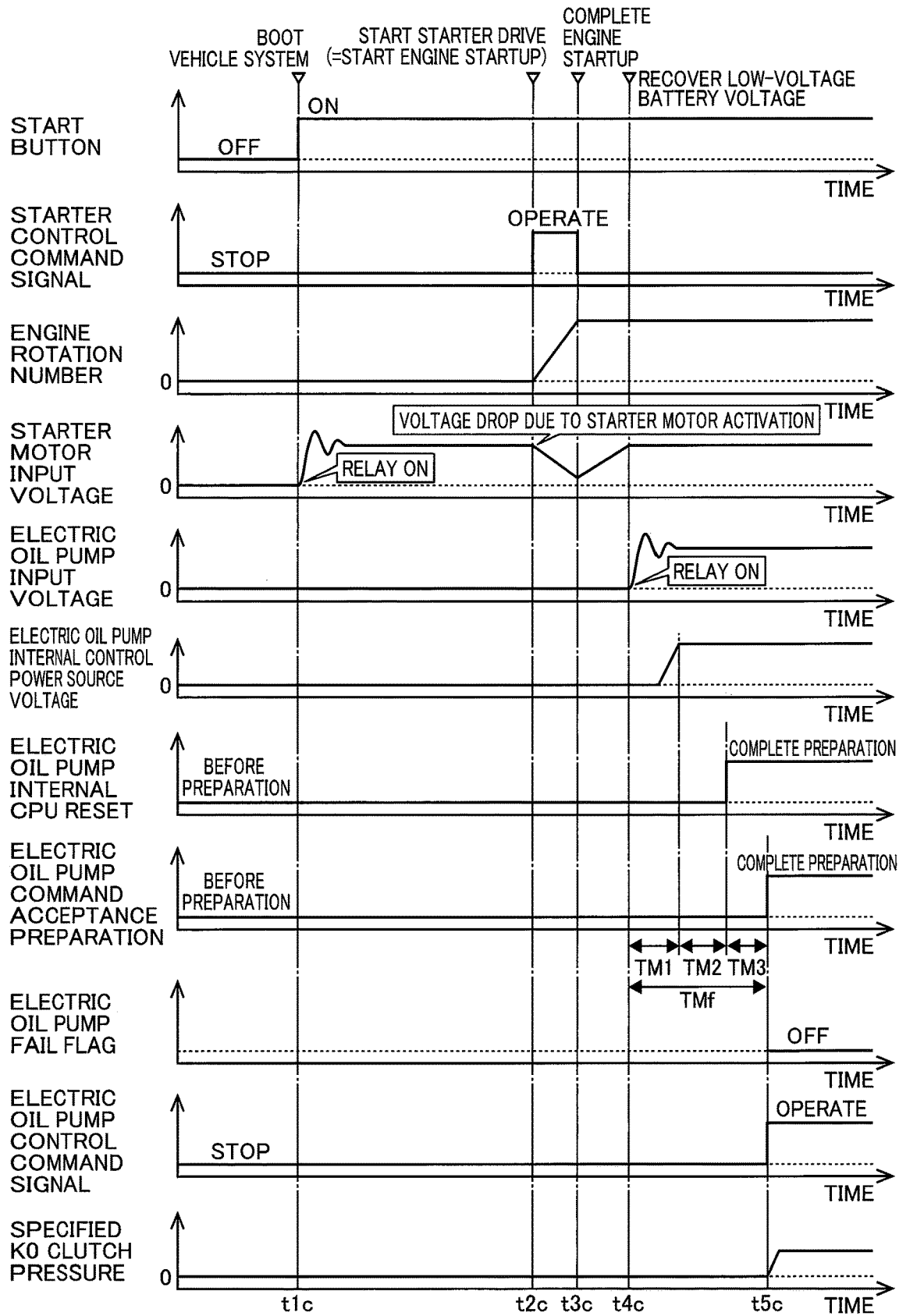
FIG. 8 is a view showing an example of a timechart in case of executing the control actions shown in the flowchart of FIG. 7.

FIG. 7 is a flowchart explaining a principal part of control actions of the electronic control unit 90, the flowchart explaining control actions for achieving the size reduction of the electric oil pump 60 while dealing with the engine startup using the starter motor 62, the flowchart being executed after booting the system of the vehicle 10 by the operation of the start button 68 for example. FIG. 7 shows another embodiment different from the flowchart of FIG. 5. FIG. 8 is a view showing an example of a timechart in case of executing the control actions shown in the flowchart of FIG. 7.

In FIG. 7, steps of the flowchart correspond to the functions of the startup control unit 98. At S10B, the starter relay 122 is switched on. Then at 520B, the starter control command signal $S_{st}$ for activating the starter motor 62 is issued. Then at 530B, it is determined whether the startup of the engine 12 has been completed. If determination at S30B is negative, S30B is repeatedly executed. If determination at S30B is affirmative, it is determined at S40B whether the low-voltage battery voltage $V_{batlow}$ is higher than or equal to a specified value. If determination at S40B is negative, S40B is repeatedly executed. If determination at S40B is affirmative, the electric oil pump relay 120 is switched on at S50B. It is then determined at S60B whether the electric oil pump 60 is not abnormal. If determination at S60B is negative, S60B is repeatedly executed. If determination at S60B is affirmative, the electric oil pump control command signal $S_{op}$ for activating the electric oil pump 60 i.e. the motor 70 for electric oil pump is issued at S70B. Then at S80B, a command for switching the K0 clutch 20 from the released state to the engaged state is issued. Afterward, when the switching of the K0 clutch 20 to the engaged state is completed, this routine comes to an end.

FIG. 8 is a view showing an example in case of executing the starter startup control $CT_{stmtr}$ when booting the system of the vehicle 10. In FIG. 8, point-in-time t1c indicates a point in time when the system of the vehicle 10 is booted. Booting the system of the vehicle 10 causes switching of the starter relay 122 to the on state. Subsequently, operation of the starter motor 62 is started in response to a command from the electronic control unit 90 to start cranking of the engine 12 (see point-in-time t2c). Although at this time the low-voltage battery voltage $V_{batlow}$ drops by the cranking, the electric oil pump 60 has not yet been activated with the electric oil pump relay 120 remaining off, so that no low-voltage fail state occurs in the electric oil pump 60 (see points-input-time t2c to t4c). When the cranking of the engine 12 is completed (see point-in-time t3c) and the low-voltage battery voltage $V_{batlow}$ rises and recovers to a specified value e.g. a normal mode voltage of the low-voltage battery 66, the electric oil pump relay 120 is switched to the on state (see point-in-time t4c). Switching of the electric oil pump relay 120 to the on state activates the electric oil pump 60. The fixed preparation time TMf (=TM1+TM2+TM3) is needed for the electric oil pump 60 to become ready to accept a command from the electronic control unit 90 after the activation of the electric oil pump 60 (see points in time t4c to t5c). When the electric oil pump 60 issues the off signal of the electric oil pump fail flag $FL_{fop}$ with the CPU 76 for electric oil pump ready to accept a command from the electronic control unit 90 (see point-in-time t5c), the electronic control unit 90 issues a command to activate the electric oil pump 60 so that the K0 clutch 20 is switched to the engaged state (see point-in-time t5c or thereafter).

As set forth above, according to this embodiment, similar to the above-described first embodiment, it is possible to achieve the size reduction of the electric oil pump 60 while dealing with the startup of the engine 12 using the starter motor 62.

According to this embodiment, startup of the engine 12 is started with the starter motor 62 being supplied with electric power from the low-voltage battery 66, and, if the low-voltage battery voltage $V_{batlow}$ is determined to be higher than or equal to the low-voltage fail threshold value $V_{fail}$ after the completion of cranking by the starter motor 62, supply of electric power from the low-voltage battery 66 to the electric oil pump 60 is started, so that discharge of hydraulic oil OIL is started by the electric oil pump 60, thus making it possible to avoid the state where the electric oil pump 60 cannot work normally when the low-voltage battery voltage $V_{batlow}$ drops accompanying the cranking. Thus, in case that the K0 oil pressure $PR_{k0}$ originating from hydraulic oil OIL is supplied to the K0 clutch 20 to switch the K0 clutch 20 from the released state to the engaged state, the K0 clutch 20 can be engaged while avoiding the state where the electric oil pump 60 cannot work normally, i.e., without generating the low-voltage fail state in the electric oil pump 60.

According to this embodiment, in case that the electric oil pump 60 has been determined to be in the state where its normal operation is possible after the completion of cranking by the starter motor 62, discharge of hydraulic oil OIL is started by the electric oil pump 60, so that normal operation of the electric oil pump 60 can be ensured.

Although the embodiments of the present invention have hereinabove been described in detail with reference to the drawings, the present invention is applicable to other modes.

For example, in the above-described embodiments, the vehicle 10 is capable of performing the clutch startup control $CT_{stclt}$ and the starter startup control $CT_{stmtr}$ as the engine startup control $CT_{st}$, but the present invention is not limited to those modes. For example, the present invention is applicable to any vehicle capable of performing at least the starter startup control $CT_{stmtr}$.

Although it is assumed in the embodiments described above that the electric oil pump 60 can recover from the low-voltage fail state or the abnormal state, if the electric oil pump low-voltage fail flag $FL_{flv}$ or the electric oil pump fail flag $FL_{fop}$ remains on, the starter startup control $CT_{stmtr}$ may be interrupted under the ultralow temperature environment by use of a timer counting from a point in time of system booting. In this case, the starter startup control $CT_{stmtr}$ may be resumed when the start button 68 is again operated.

In the above-described embodiments, at S40 in the flowchart of FIG. 5, it may be determined whether the electric oil pump 60 is in the state where its normal operation is possible. That is, at S40 in the flowchart of FIG. 5, it may be determined whether the electric oil pump 60 is not abnormal, i.e., whether the electric oil pump fail flag $FL_{fop}$ is off. At S60B in the flowchart of FIG. 7, it may be determined whether the electric oil pump 60 has recovered from the low-voltage fail state, i.e., whether the electric oil pump low-voltage fail flag $FL_{flv}$ is off. In this manner, the flowcharts of FIGS. 5 and 7 may be appropriately altered.

Although in the above-described embodiments the planetary gear type automatic transmission is exemplified as the automatic transmission 24, this mode is not limitative. For example, the automatic transmission 24 may be a synchronous mesh parallel twin-shaft automatic transmission including a publicly known dual clutch transmission (DCT), a publicly known belt type continuously variable transmission, or the like. The automatic transmission 24 need not necessarily be disposed.

Although in the above-described embodiments the torque converter 22 is used as the hydrodynamic power transmitting device, this mode is not limitative. For example, instead of the torque converter 22, another type of hydrodynamic power transmitting device such as a fluid coupling not having a torque amplification action may be employed as the hydrodynamic power transmitting device. The hydrodynamic power transmitting device need not necessarily be disposed, and may be replaced with a starting clutch for example. In other words, the present invention is applicable to any vehicle as long as it includes the engine, the hydraulic clutch disposed on the power transmission path between the engine and the wheels, the starter motor, the electric oil pump device discharging hydraulic oil generating oil pressure supplied to the clutch, and the power supply device supplying electric power driving each of the starter motor and the electric oil pump device.

The above are mere embodiments and the present invention can be carried out in modes variously changed or modified based on the knowledge of those skilled in the art.

10: vehicle
12: engine
14: driving wheels
20: K0 clutch (clutch)
54: high-voltage battery (high-voltage power supply device)
60: electric oil pump (electric oil pump device)
62: starter motor
66: low-voltage battery (power supply device)
90: electronic control unit (control unit)
98: startup control unit
MG: electric motor

The invention claimed is:

1. A control device of a vehicle, the vehicle including an engine, a hydraulic clutch disposed on a power transmission path between the engine and driving wheels, a starter motor for use in startup of the engine, an electric oil pump device discharging hydraulic oil generating oil pressure supplied to the clutch, and a power supply device supplying electric power driving each of the starter motor and the electric oil pump device, the control device comprising:
at least one processor configured to perform starter startup control of starting discharge of the hydraulic oil by the electric oil pump device after determining that output voltage of the power supply device or input voltage of the electric oil pump device is higher than or equal to a fixed voltage after completion of cranking by the starter motor upon startup of the engine using the starter motor.

2. The control device of a vehicle of claim 1, wherein
when the at least one processor configured performs the starter startup control, the at least one processor is configured to supply the oil pressure originating from the hydraulic oil to the clutch to switch the clutch from a released state to an engaged state after starting discharge of the hydraulic oil by the electric oil pump device.

3. The control device of a vehicle of claim 1, wherein
the at least one processor is configured to start startup of the engine with the starter motor and the electric oil pump device each being supplied with the electric power, and, if the at least one processor determines that the input voltage of the electric oil pump device is higher than or equal to the fixed voltage after completion of the cranking, start discharge of the hydraulic oil by the electric oil pump device.

4. The control device of a vehicle of claim 3, wherein
the at least one processor is configured to determine whether the input voltage of the electric oil pump device is higher than or equal to the fixed voltage after completion of the cranking in a state where a fixed preparation time needed for the electric oil pump device to become ready to work has elapsed from a point in time of supply of the electric power to the electric oil pump device has started.

5. The control device of a vehicle of claim 3, wherein
the at least one processor is configured to determine whether the input voltage of the electric oil pump device is higher than or equal to the fixed voltage, by determining whether the electric oil pump device has detected that the input voltage of the electric oil pump device is higher than or equal to the fixed voltage.

6. The control device of a vehicle of claim 1, wherein
the at least one processor is configured to start startup of the engine with the starter motor being supplied with the electric power, and, if the at least one processor determines that the output voltage of the power supply device is higher than or equal to the fixed voltage after completion of the cranking, start supply of the electric power to the electric oil pump device to start discharge of the hydraulic oil by the electric oil pump device.

7. The control device of a vehicle of claim 1, wherein
if the at least one processor determines that the electric oil pump device is in a state where its normal operation is possible after completion of the cranking, the at least one processor is configured to start discharge of the hydraulic oil by the electric oil pump device.

8. The control device of a vehicle of claim 1, wherein
the at least one processor is configured to perform clutch startup control of:
controlling the clutch to transmit a cranking torque required for cranking that increases rotation number of the engine;
controlling an electric motor driven by electric power supplied from a high-voltage power supply device disposed to charge the power supply device, the electric motor being coupled to a power transmission path between the clutch and the driving wheels in a power transmittable manner to output the cranking torque in liaison with cranking by the clutch; and
controlling the engine to start its operation in liaison with the cranking by the clutch, and wherein
in case that the clutch startup control is difficult to perform, the at least one processor is configured to perform the starter startup control.

9. The control device of a vehicle of claim 8, wherein
the case that the clutch startup control is difficult to perform is a case that the engine is started for the first time after activation of the vehicle.

10. The control device of a vehicle of claim 8, wherein
the case that the clutch startup control is difficult to perform is a case that the vehicle lies in a predefined ultralow temperature environment where the electric motor is determined as not being properly controlled.

* * * * *